US 9,674,248 B2

(12) United States Patent
Namboodiri et al.

(10) Patent No.: US 9,674,248 B2
(45) Date of Patent: *Jun. 6, 2017

(54) MEDIA STREAM MODIFICATION BASED ON CHANNEL LIMITATIONS

(71) Applicant: Ricoh Co., Ltd., Tokyo (JP)

(72) Inventors: Vipin Namboodiri, Karnataka (IN); Haixia Yu, San Jose, CA (US); Taro Terashi, Cupertino, CA (US)

(*) Notice: Subject to any disclaimer, the term of this patent is extended or adjusted under 35 U.S.C. 154(b) by 168 days.

This patent is subject to a terminal disclaimer.

(21) Appl. No.: 13/787,798

(22) Filed: Mar. 6, 2013

(65) Prior Publication Data

US 2014/0019631 A1 Jan. 16, 2014

Related U.S. Application Data

(63) Continuation of application No. 13/665,859, filed on Oct. 31, 2012, now Pat. No. 9,516,079.

(Continued)

(51) Int. Cl.
*G06F 15/16* (2006.01)
*H04L 29/06* (2006.01)

(52) U.S. Cl.
CPC ............ *H04L 65/60* (2013.01); *H04L 65/403* (2013.01); *H04L 65/4084* (2013.01); *H04L 65/605* (2013.01)

(58) Field of Classification Search
CPC .......... H04N 21/2365; H04N 21/21805; H04L 65/60; H04L 65/403; H04L 65/4084;
(Continued)

(56) References Cited

U.S. PATENT DOCUMENTS 6,937,767 B1 8/2005 Burak et al.
7,590,550 B2 9/2009 Schoenberg
(Continued)

FOREIGN PATENT DOCUMENTS

IL WO 0177864 A1 * 10/2001 ....... G06F 17/30017

OTHER PUBLICATIONS

Non-Final Office Action for U.S. Appl. No. 13/665,859, dated Sep. 8, 2015, 15 pages.
(Continued)

*Primary Examiner* — Oleg Survillo
*Assistant Examiner* — Tan Doan
(74) *Attorney, Agent, or Firm* — Patent Law Works LLP

(57) ABSTRACT

A system and method for modifying media stream based on a channel limitation are disclosed. In one embodiment, the system includes a channel analyzer, a modality of interest (MOI) identification module and an inter-modality resolution modification module. The channel analyzer determines a channel limitation. The MOI identification module receives a plurality of media streams and identifies at least one MOI. The inter-modality resolution modification module modifies a resolution of at least one of the media streams based on the channel limitation and content of the media streams. In another embodiment, the system includes a region of interest identification (ROI) module and an intra-modality resolution modification module instead of, or in addition to, the MOI identification module and inter-modality resolution modification module. The ROI identification module receives a media stream and identifies at least one ROI within the media stream.

20 Claims, 9 Drawing Sheets

Related U.S. Application Data

(60) Provisional application No. 61/672,270, filed on Jul. 16, 2012.

(58) Field of Classification Search
CPC ... H04L 65/605; H04L 43/06; H04L 41/0813; H04L 43/04; H04L 43/16
USPC .......................................................... 709/231
See application file for complete search history.

(56) References Cited

U.S. PATENT DOCUMENTS

| | | | |
|---|---|---|---|
| 8,830,307 B2* | 9/2014 | Hirakawa | A61B 1/00045 348/45 |
| 2006/0274655 A1* | 12/2006 | Richter | H04L 12/18 370/230 |
| 2007/0161898 A1 | 7/2007 | Hao et al. | |
| 2009/0012821 A1* | 1/2009 | Besson et al. | 705/3 |
| 2009/0275808 A1* | 11/2009 | DiMaio et al. | 600/301 |
| 2010/0122336 A1* | 5/2010 | Hunt et al. | 726/11 |
| 2011/0301441 A1* | 12/2011 | Bandic et al. | 600/306 |
| 2013/0010049 A1 | 1/2013 | Mostafa et al. | |

OTHER PUBLICATIONS

Final Office Action for U.S. Appl. No. 13/665,859, dated Apr. 23, 2015, 14 pages.
Final Office Action for U.S. Appl. No. 13/665,859, dated Feb. 4, 2016, 16 pages.
Notice of Allowance for U.S. Appl. No. 13/665,859, dated Jul. 26, 2016, 19 pages.

* cited by examiner

MEDIA STREAM MODIFICATION BASED ON CHANNEL LIMITATIONS

CROSS REFERENCE TO RELATED APPLICATIONS

This application is a continuation of U.S. application Ser. No. 13/665,859, entitled "Media Stream Modification Based on Channel Limitations," filed Oct. 31, 2012, which claims priority under 35 USC §119(e) to U.S. Application No. 61/672,270, entitled "Media Stream Modification Based on Channel Limitations," filed Jul. 16, 2012, the entirety of each of which is herein incorporated by reference.

BACKGROUND OF THE INVENTION

Field of the Invention

The specification relates to transferring a media stream. In particular, the specification relates to modifying a media stream based on a channel limitation for telemedicine.

Description of the Problem

Medical access is difficult to obtain for many people, especially when they live in rural areas. Doctors may not be available in the rural area, or any available doctors may be general practitioners that lack the technology and/or expertise to properly diagnose specific problems. Moreover, even when doctors are available to treat the patients, they have trouble accessing the patient's medical history because access to bandwidth is limited in rural areas. As a result, treatment is limited by incomplete medical knowledge of the patient.

Previous attempts to solve this problem have included telemedicine, which is when a patient communicates remotely with a doctor over the internet. Simply providing the patient with a remote doctor, however, fails to solve the problem of connectivity limitations such as bandwidth. Previous communication attempts have relied on having strong bandwidth, such as an Ethernet connection, but this is not widely available in rural areas. If the connection is poor, transmissions can take too long to be sent. These kinds of issues can be too complicated for the staff servicing the remote facility to solve.

SUMMARY OF THE INVENTION

The specification overcomes the deficiencies and limitations of the prior art at least in part by providing a system and method for modifying a media stream based on a channel limitation. In one embodiment, the system includes a channel analyzer, a modality of interest identification module and an inter-modality resolution modification module.

The channel analyzer determines a channel limitation. The modality of interest identification module receives a plurality of media streams, the media streams including at least one type of media, and identifies at least one modality of interest in the media streams. In one embodiment, the media streams include medical information and the modality of interest is based on the media stream that includes information for diagnosing a condition. In one embodiment, the media streams include a medical device stream from a medical device using store and forward technology. In one embodiment, the media streams are associated with a patient and the system further includes a medical analyzer for performing an initial diagnosis of the patient, and the modality of interest is based on the media stream that includes information to confirm the initial diagnosis.

The inter-modality resolution modification module modifies a resolution of at least one of the media streams based on the channel limitation, the modification further based on content of the media streams, and sends the media streams including the modified stream for presentation. In one embodiment, the media streams include visual media and modifying the resolution includes modifying an optical resolution of the visual media. In another embodiment, modifying the resolution includes modifying a media stream sample rate. In one embodiment, modifying the resolution includes maintaining the resolution of a first media stream, the first media stream associated with the modality of interest, and lowering the resolution (e.g. image resolution, frame rate and/or bit depth) of other media streams without compromising the clinical acceptability of the media streams.

In another embodiment, the system comprises a channel analyzer, a region of interest identification module and an intra-modality resolution modification module. The channel analyzer determines a channel limitation. The region of interest identification module receives a media stream, the media stream including at least one type of media, and identifies at least one region of interest within the media stream. In one embodiment, the media stream includes medical information and the region of interest is based on a portion of the media stream that includes information for diagnosing a condition. In one embodiment, the media stream includes a medical device stream from a medical device using store and forward technology. In one embodiment, the media stream is associated with a patient and the system further includes a medical analyzer for performing an initial diagnosis of the patient, and the region of interest is based on the media stream that includes information to confirm the initial diagnosis.

The intra-modality resolution modification module modifies a resolution of the media stream based on the channel limitation, the modification maintaining a higher resolution for the at least one region of interest within the media stream, and sends the modified stream for presentation. In one embodiment, the media stream includes visual media and modifying the resolution includes modifying the optical resolution of the visual media. In another embodiment, the media stream includes a visual media and modifying the resolution includes modifying the frame rate of the visual media. In one embodiment, the media stream includes an auditory media and modifying the resolution includes modifying the bit rate of the auditory media.

In yet another embodiment, the system comprises a channel analyzer, a modality of interest identification module, an inter-modality resolution modification module, a region of interest identification module and an intra-modality resolution modification module.

In one embodiment, modifying the resolution of at least one media stream based on a channel limitation beneficially reduces the amount of bandwidth required while maintaining the resolution of the modality of interest and/or a region of interest within the media stream. Such benefits are advantageous in the context of remote medical consultations. For example, assume the patient is in a small village and connected for a remote medical consultation by a highly limited 3G connection, in one embodiment, modifying the resolution of at least one media stream based on a channel limitation allows a medical service provider to remotely and accurately diagnose a medical condition despite the limitations of the 3G connection.

The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The embodiments are illustrated by way of example, and not by way of limitation in the figures of the accompanying drawings in which like reference numerals are used to refer to similar elements.

DETAILED DESCRIPTION

Figure 1:
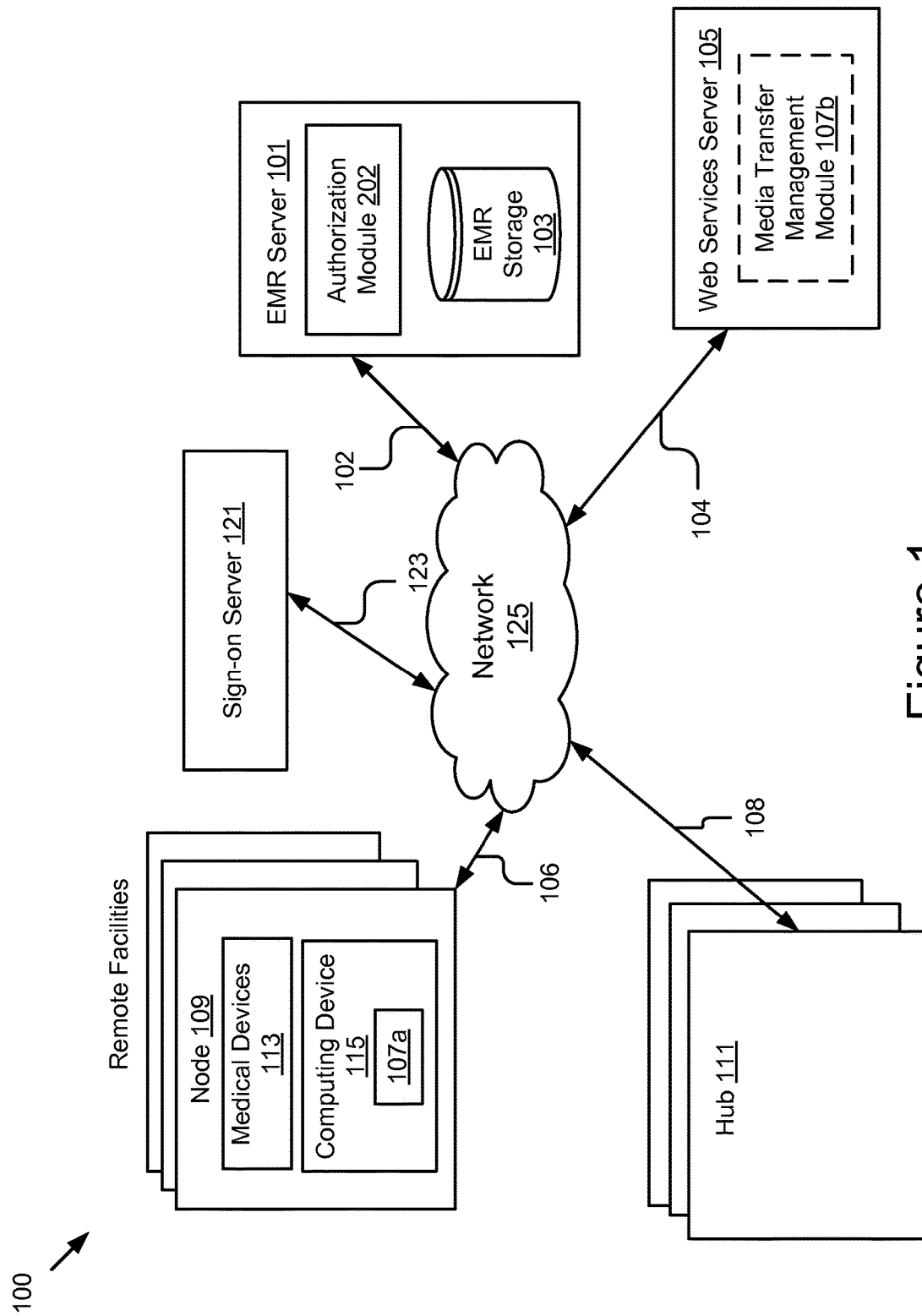
FIG. 1 illustrates a system for modifying a media stream based on a channel limitation according to one embodiment.

A system and method for modifying a media stream based on a channel limitation. In the following description, for purposes of explanation, numerous specific details are set forth in order to provide a thorough understanding of the embodiments. It will be apparent, however, to one skilled in the art that the embodiments can be practiced without these specific details. In other instances, structures and devices are shown in block diagram form in order to avoid obscuring the embodiments. For example, one embodiment is described below with reference to user interfaces and particular hardware. However, the present embodiments apply to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including, for example, "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The embodiments can take the form of an entirely hardware embodiment, an entirely software embodiment or an embodiment containing both hardware and software elements. An exemplary embodiment is implemented in software, which includes but is not limited to firmware, resident software, microcode, etc.

Furthermore, the embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks.

Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

System Overview

FIG. 1 illustrates a block diagram of a system 100 for modifying a media stream based on a channel limitation according to one embodiment. The illustrated system 100 includes one or more nodes 109 (referred to collectively as nodes 109 or individually as node 109), a sign-on server 121, an electronic medical record (EMR) server 101, one or more hubs 111 (referred to collectively as hubs 111 or individually as hub 111) and a web services server 105. In the illustrated embodiment, these entities are communicatively coupled via a network 125.

The nodes 109 in FIG. 1 are used by way of example. While FIG. 1 illustrates three nodes 109, the present specification applies to any system architecture having one or more nodes 109. Similarly, the hubs 111 in FIG. 1 are used by way of example. While FIG. 1 illustrates three hubs 111, the present specification applies to any system architecture having one or more hubs 111. Additionally, while only one network 125 is coupled to the nodes 109, the hubs 111, the EMR server 101 and the web services server 105, in practice any number of networks 125 can be connected to the entities. Furthermore, although only one EMR server 101 is shown, it will be recognized that multiple EMR servers 101 may be present. Moreover, although only one web services server 105 is shown, it will be recognized that multiple web services servers 105 may be present.

In one embodiment, a media transfer management module 107a is included in the computing device 115 of a node 109 and is operable on the computing devices, which is connected to the network 125 as illustrated by signal line 106. In another embodiment, a media transfer management module 107b is included in the web services server 105 and is operable on the web services server 105, which is connected to the network 125 via signal line 104. In one embodiment, the media transfer management module 107a/107b (referred to generally as the media transfer management module 107) includes multiple, distributed modules that cooperate with each other to perform the functions described below. Details describing the functionality and components of the media transfer management module 107 are explained in further detail below with regard to FIG. 2B.

The network 125 enables communications between the nodes 109, the EMR server 101, the hubs 111, the nodes 109 and the web services server 105. Thus, the network 125 can include links using technologies including, for example, Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 125 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 125 can be represented using technologies and/or formats including the hypertext markup language (HTML), the extensible markup language (XML), etc. In addition, all or some of links can be encrypted using conventional encryption technologies, for example, the secure sockets layer (SSL), Secure HTTP and/or virtual private networks (VPNs) or Internet Protocol security (IPsec). In another embodiment, the entities can use custom and/or dedicated data communications technologies instead of, or in addition to, the ones described above. Depending upon the embodiment, the network 125 can also include links to other networks.

In one embodiment, the network 125 is a partially public or a wholly public network, for example, the Internet. The network 125 can also be a private network or include one or more distinct or logical private networks (e.g., virtual private networks, Wide Area Networks ("WAN") and/or Local Area Networks ("LAN")). Additionally, the communication links to and from the network 125 can be wired or wireless (i.e., terrestrial or satellite-based transceivers). In one embodiment, the network 125 is an IP-based wide or metropolitan area network.

In the illustrated embodiment, the nodes 109 are communicatively coupled to the network 125 as illustrated by signal line 106. The hubs 111 are communicatively coupled to the network 125 as illustrated by signal line 108. The EMR server 101 is communicatively coupled to the network 125 via signal line 102. The web services server is communicatively coupled to the network via signal line 104.

The sign-on server 121 is code and routines for comparing a user's access credentials with the information associated with the user and authenticating the user. For example, the sign-on server 121 authenticates users of the hubs 111 and the nodes 109 using HTTP, where the access credentials include a login/password or secure certificate options. In one embodiment, the sign-on server 121 receives the user information from the EMR server 101. If the sign-on server 121 successfully authenticates the user, the sign-on server 121 issues a identification (ID) token to the user. In one embodiment, the ID token has a predetermined time-to-live. The user can use the ID token as long as the ID token has not expired. In another embodiment, the ID token is also self-authenticable (e.g., the ID token is authenticable without proof).

The sign-on server 121 transmits the ID token to the EMR server 101 so that the EMR server 101 can confirm the authenticity of the user before initiating the authorization process. If the authentication is unsuccessful, the sign-on server 121 prompts the user to re-enter the user information, refuses the user access to the system 100 or employs another method known to those of ordinary skill in the art.

In one embodiment, EMR server 101 includes an authorization module 202 and EMR storage 103.

The authorization module 202 is code and routines for establishing a connection between the node 109 and the hub 111 and permitting the users to access a media stream. In one embodiment, the authorization module 202 is a set of instructions executable by a processor. In another embodiment, the authorization module 202 is stored in a memory and is accessible and executable by the processor.

In one embodiment, the authorization module 202 receives an access request from the user that includes the ID token (e.g., a request for an EMR or a request for a media stream). The authorization module 202 authenticates the user based on the ID token and determines whether the user has permission to access the requested data.

In one embodiment, the EMR server 101 evaluates the user's access request for an EMR against the data in the EMR and determines whether to authorize the user access to the EMR. For example, when a cardiologist at the hub 111 requests a patient record, the EMR server 101 determines to allow the cardiologist to access a first record related to the patient's arrival at the node 109 for a medical consultation regarding his/her fast heartbeat. Alternatively, if an administrator at the hub 111 requests a patient record, the EMR server 101 determines to prohibit the administrator from accessing the patient record.

In one embodiment, the EMR server 101 determines whether to grant a user access to a media stream based on information contained in the EMR storage 103. For example, if medical history records in the EMR storage 103 for a patient contain old electrocardiograms and results for heart testing, the EMR server 101 determines to authorize a cardiologist at the hub 111 to access a media stream including a new electrocardiogram that is taken after the patient's arrival at the node 109. In one embodiment, the EMR server 101 determines whether to authorize a user access to one or more media streams that pertain to a patient's current arrival and past arrivals. For the media stream pertaining to a past arrival of a patient, the EMR server 101 authorizes a user to directly access the stored information.

In yet another embodiment, when a patient arrives the node 109 seeking a medical consultation, the EMR server 101 authorizes the patient and/or node personnel (e.g., a nurse) at the node 109 for accessing information (e.g., an EMR or a media stream) that may be used during the entire consultation. The EMR server 101 authorizes a user at the hub 111 (e.g., a doctor), who provides the medical consultation, each time when the user makes a request based on selecting a device. For example, in a medical consultation, the EMR server 101 provides a first authorization to a doctor responsive to the doctor selecting a high-resolution camera and requesting a high-resolution image from the camera and provides a second authorization to the doctor responsive to the doctor selecting a thermometer and requesting a body temperature measured by the thermometer.

If the user has permission, the authorization module 202 generates an access token for the user. In one embodiment, the access token includes an identifier that uniquely identifies the stream. In one embodiment, the identifier is a universally unique identifier (UUID) that consists of a patient encounter ID that identifies the patient's arrival, a device name and an instance number. In another embodiment, the access token is also self-authenticable. By generating the access token for the user, the EMR server 101 authorizes the user access to an EMR and/or a media stream. If the access request is for a media stream, the EMR server 101 directs the user to a specified web services server 105. For example, where a user from the hub 111 and a user from the node 109 are requesting access to a live encounter with each other, the EMR server 101 directs the users to the same web services server 105. This is helpful for ensuring local coherency for live encounters and performing load balancing across streaming servers by not placing all the users at one server when other servers are available.

In one embodiment, the EMR storage 103 is a database that includes electronic medical records for all patients of the system 100. In one embodiment, each time a node 109 or hub 111 transmits information about a patient, the EMR storage 103 updates that patient's electronic medical record. In other embodiment, the EMR server 101 also communicates with 105, 109 and 111 to control access to a patient's electronic medical record stored on the EMR storage 103.

In one embodiment, the web services server 105 includes a media transfer management module 107 and a database (not shown) for storing a stream archive. The stream archive stores the media for later access by a medical service provider that treated a patient or for when the medical service provider (e.g. a general service provider) refers the patient to a specialist. The database provides pointers to the data so that users (e.g. a medical service provider) can access the media directly instead of making a copy. In one embodiment, the database archives pointers to one or more of different parts of the media and other pieces of media. For example, where a patient sees a doctor about a heart condition, the stethoscope audio includes pointers to the regions of interest (ROI) in the audio recording and pointers to ROIs in an electrocardiogram (ECG).

In one embodiment, the node 109 is where patients receive a medical consultation and includes a computing device 115 and medical devices 113. In one embodiment, the node 109 is located remotely from the hubs 111. For example, the node 109 is a facility physically located in a rural area and a hub 111 is physically located in a city or other metropolitan area. In one embodiment, the node 109 is mobile. For example, the node 109 is a vehicle with a computing device 115 and medical devices 113, which travels to various locations and patients receive medical consultation at the vehicle.

In one embodiment, the medical devices 113 include one or more of a general medical device and a specific medical device. Examples of general medical devices include, but are not limited to, a stethoscope, a blood pressure meter, a pulse oximeter, a thermometer, an ophthalmoscope, a weight and height scale, an otoscope, a camera, etc. Examples of specific medical devices include, but are not limited to, a telecardiology device (e.g. an ECG machine), a telepathology device (e.g. a microscope), a teledermatology device (e.g. a high-resolution camera), a teleradiology device (e.g. an ultrasound machine), etc. In one embodiment, node personnel use one or more general medical devices to obtain vital signs and specific medical devices based on the patient's complaint.

In one embodiment, one or more of the medical devices 113 use store and forward technology, which collects and stores patient data and forwards the data to one or more of the EMR server 101 and the web services server 105. For example, assume the node 109 includes a blood pressure meter with store and forward technology. In one embodiment, the patient's blood pressure is collected and stored by the blood pressure meter then forwarded, via the network 125, to the EMR server 101 to update the patient's EMR and to the web services server 105 for viewing by a medical service provider at a hub 111. Such an embodiment may beneficially reduce errors from node personnel misreading the medical device 113 and transcription errors from node personnel miss-recording the output of the medical device 113.

In some embodiments, the node 109 uses store and forward when there is no direct connectivity between the node 109 and the hub 111. The node 109 stores a local copy of the patient data and synchronizes with the hub 111 whenever the node 109 is connected to the Internet. This is particularly helpful in this situation because the node 109 can often experience poor network connections. For example, when a technician is out in a remote region helping patients, the technician can gather the patient data, wait until the node 109 has a better connection, sync up the data to the EMR server 101 and a notification will be sent to the appropriate doctor to view the case and perform a diagnosis. After receiving the diagnosis from the doctor, the technician can give out prescribed medicine or perform and an additional lab-work request for the patient.

The node 109 is staffed by personnel to operate the computing device 115 and medical devices 113. For example, the personnel includes a nurse trained to use the medical devices 113 to obtain the patient's medical information and to use the computing device 115 to register the patient for medical consultation. In one embodiment, the personnel at the node 109 is not as highly educated and/or is less specialized than the medical service provider at the hub 111. For example, assume the node is staffed by one or more of a nurse, medical technician, lab technician, physician's assistant and the medical service provider is a doctor (e.g. a general practitioner or a specialist).

Staffing the node 109 with personnel that are not medical service providers may beneficially increase the effectiveness of each medical service provider in the system 100. For example, where there is a shortage of doctors in the region, each remote node 109 includes a medical technician, who may be trained more quickly than a doctor. In one embodiment, the medical technician registers the patient, takes the vital signs and uses additional medical devices 113 based on the complaint. The doctor receives the medical information of the patient, which was gathered in part by the medical technician, and consults with the patient. For example, if the patient is complaining about a rash, the technician may use the high-resolution camera to take a picture of the problematic area, which the doctor may view and discuss with the patient. The doctor's effectiveness is therefore increased by allowing the medical service provider to spend more time consulting with and diagnosing patients and less time traveling to the various, remote locations of patients and performing less specialized tasks such as patient registration, gathering basic vital signs, etc.

The node 109 includes at least one computing device 115. In one embodiment, the computing device 115 is used by a patient at the node 109 to access a medical service provider at the hub 111 for medical consultation. For example, the computing device 115 is a laptop computer, a desktop computer, a tablet computer, a mobile telephone, a personal digital assistant (PDA), a mobile email device, a television with one or more processors embedded therein or coupled thereto or any other electronic device capable of accessing the network 125. In one embodiment, the computing device 115 includes a web camera or other device for capturing video of the patient. The video of the patient is transmitted to the hub 111 after the patient is assigned a medical service provider. The computing device 115 used by a patient at the node 109 to access a medical service provider at the hub 111 for medical consultation is occasionally referred to herein as a "consultation device."

In one embodiment, a hub 111 is a centralized physical facility that connects with the nodes 109 and allows a medical service provider to remotely consult with and diagnose patients at a node 109 on an as needed basis using an information technology infrastructure (not shown). The hub 111's information technology infrastructure includes, for example, a computing device, a video conference system, a digital clipboard, a monitor, a collaboration display and a printer. The hub 111 includes software that allows doctors to log into the system, search for patients, schedule patients, order prescriptions, make notes, perform video conferencing, generate reports and perform analytics.

By allowing remote consultation of a patient at a node 109 by a medical service provider at a hub 111, the medical service provider may be more effectively used and patients may receive higher quality medical care according to one embodiment. For example, assume the medical service provider is a cardiologist in a major city where the hub 111 is located. Also assume that a patient, located in a rural location far from the city, is having heart related problems. In one embodiment, the hub 111 allows the cardiologist to remotely consult with and diagnose the rurally located patient without traveling to the patient's location. Therefore, the cardiologist may use the time the cardiologist would have spent traveling to the patient to consult with and diagnose additional patients thereby increasing the utilization of the cardiologist. Moreover, the rural patient is allowed to consult with and be diagnosed by a specialist (i.e. a cardiologist who specializes in the cardiac system, which includes the heart), which may not have otherwise been an option for the patient thereby increasing the quality of medical care the patient receives.

System Device 200

Figure 2A:
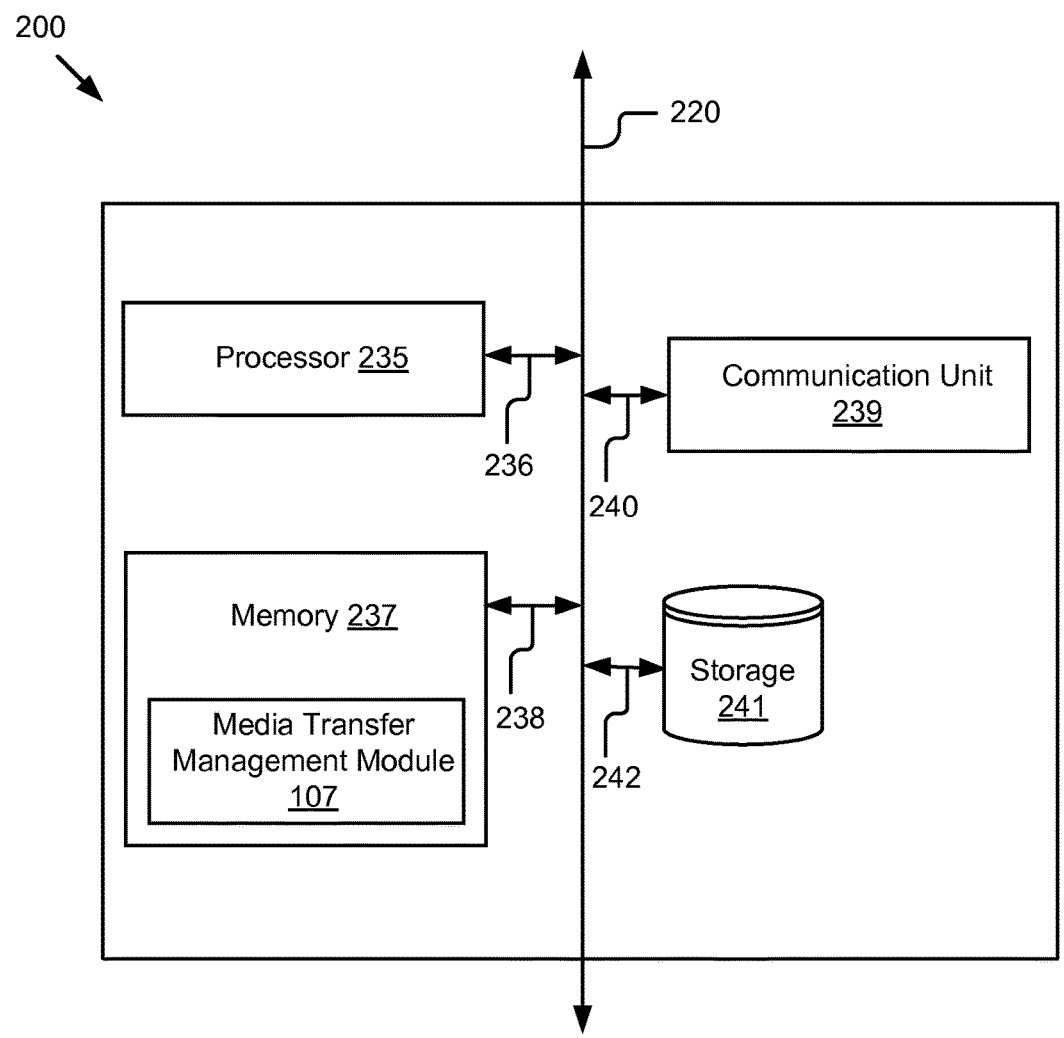
FIG. 2A is a block diagram illustrating a system device according to one embodiment.

FIG. 2A is a block diagram of a system device 200 according to one embodiment. As illustrated in FIG. 2A, the system device 200 includes a processor 235, a memory 237, communications unit 239 and storage 241 coupled to a bus 220. In one embodiment, the functionality of the bus 220 is provided by an interconnecting chipset.

The communication unit 239 receives data from the nodes 109, the hubs 111 and the EMR server 101. The communication unit 239 sends the data to the media transfer management module 107. The communication unit 239 is coupled to the bus 220 via signal line 240. In one embodiment, the communication unit 239 includes a port for direct physical connection to the network 125 or to another communication channel. For example, the communication unit 239 includes a USB, SD, CAT-5 or similar port for wired communication with the network 125. In another embodiment, the communication unit 239 includes a wireless transceiver for exchanging data with the network 113, or with another communication channel, using one or more wireless communication methods, such as IEEE 802.11, IEEE 802.16, BLUETOOTH®, near field communication (NFC) or another suitable wireless communication method. In one embodiment, the communication unit 239 includes a NFC chip that generates a radio frequency (RF) for short-range communication.

The processor 235 may be any general-purpose processor. The processor 235 comprises an arithmetic logic unit, a microprocessor, a general purpose controller or some other processor array to perform computations and execute code and routines. The processor 235 is coupled to the bus 220 for communication with the other components of the system device 200. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. The processing capability may be limited to supporting the display of images and the capture and transmission of images. The processing capability might be enough to perform more complex tasks, including various types of feature extraction and sampling. The system device 200 also includes an operating system executable by the processor including but not limited to WINDOWS®, MacOS X, Android or UNIX® based operating systems. It will be obvious to one skilled in the art that other processors, operating systems, sensors, displays and physical configurations are possible.

The memory 237 is a non-transitory storage medium. The memory 237 holds instructions and/or data that may be executed by the processor 235. In one embodiment, the instructions and/or data stored on the memory 237 comprise code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device known in the art for storing information on a more permanent basis. The memory 237 is coupled by the bus 220 for communication with the other components of the system device 200. In one embodiment, the media transfer management module 107 is stored in memory 237 and executable by the processor 235.

The media transfer management module 107 is code and routines executable by the processor 235 for modifying a media stream based on a channel limitation. In one embodiment, the media transfer management module 107 is a set of instructions executable by the processor 235. In another embodiment, the media transfer management module 107 is stored in the memory 237 and is accessible and executable by the processor 235. Details describing the functionality and components of the media transfer management module 107 are explained in further detail below in reference to FIG. 2B.

The storage device 241 is any device capable of holding data, like a hard drive, compact disk read-only memory (CD-ROM), DVD, or a solid-state memory device. The storage device 241 is a non-volatile memory device or similar permanent storage device and media. The storage device 241 stores data and instructions for processor 208 and comprises one or more devices including a hard disk drive, a floppy disk drive, a CD-ROM device, a DVD-ROM device, a DVD-RAM device, a DVD-RW device, a flash memory device, or some other mass storage device known in the art. In one embodiment, the storage device 241 stores data and information of the system device 200. For example, data and information generated by the media transfer management module 107 and its components.

In one embodiment, the system device is a web services server 105. In one embodiment, the storage device 241 is a stream archive which stores media for later access by a medical service provider that treated a patient or for when the medical service provider (e.g. a general service provider) refers the patient to a specialist. In one embodiment, the web services server 105 provides pointers to the data so that users (e.g. a medical service provider) can access the media directly instead of making a copy. In one embodiment, the storage device 241 archives pointers to one or more of different parts of the media and other pieces of media. For example, where a patient sees a doctor about a heart condition, the stethoscope audio includes pointers to the regions of interest (ROI) in the audio recording and pointers to ROIs in an electrocardiogram (ECG). Other scenarios where ROI could be deployed are images of skin captured by a general examination camera and ultrasound images.

As is known in the art, a system device 200 can have different and/or other components than those shown in FIG. 2A. For example, the system device 200 can have one or more of a display (not shown), speakers or another form of audio output (not shown), an input device (not shown) including, but not limited to, one or more of a mouse, track ball, or other type of pointing device, a keyboard, a microphone, a web camera, etc. Moreover, the storage device 241 can be local and/or remote from the system device 200 (e.g., a storage area network (SAN)).

As is known in the art, the system device 200 is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored on the storage device 241, loaded into the memory 237 and executed by the processor 235.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Media Transfer Management Module 107

Figure 2B:
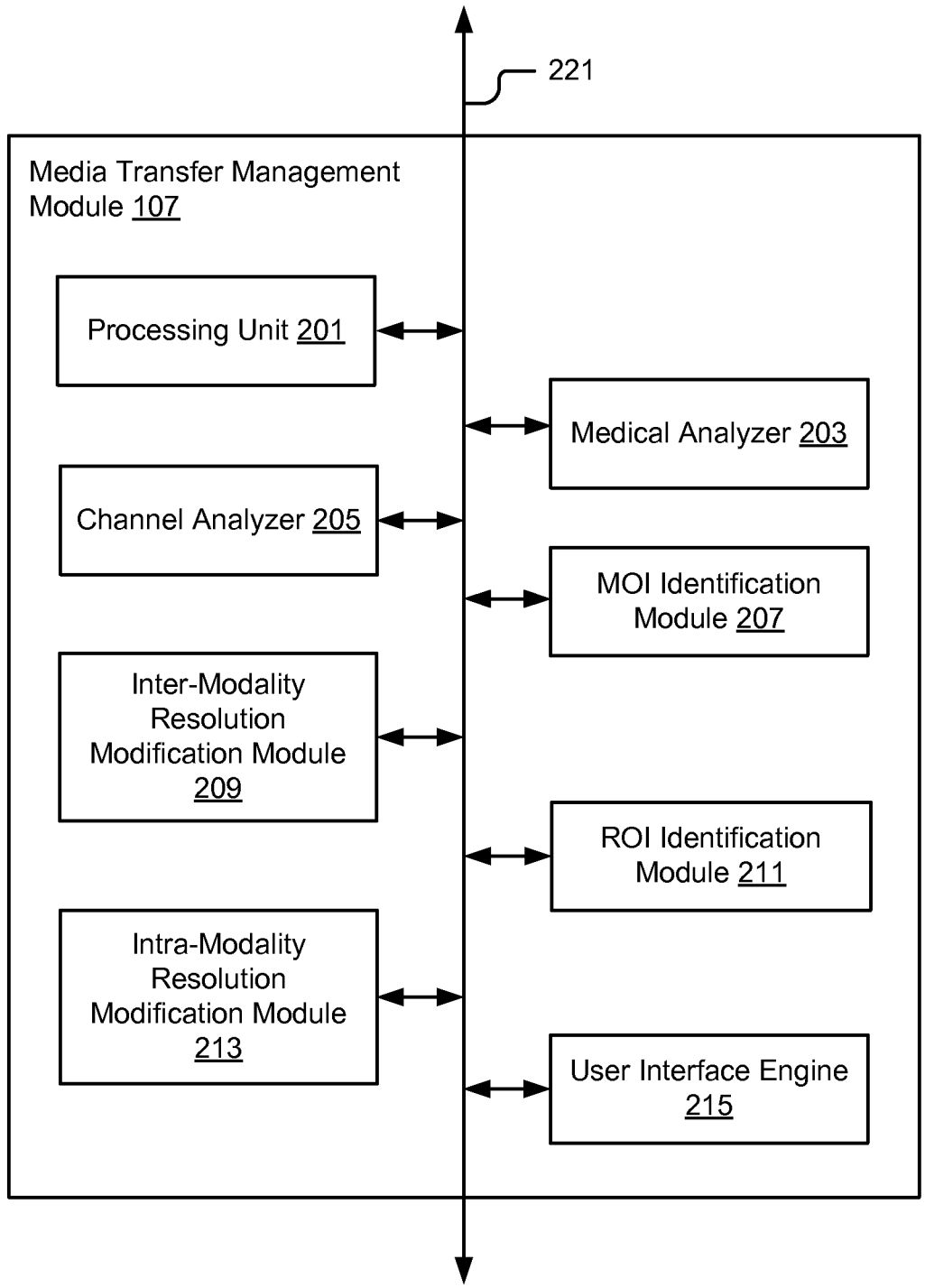
FIG. 2B is a block diagram illustrating a media transfer management module according to one embodiment.

Referring now to FIG. 2B, the media transfer management module 107 is shown in more detail according to one embodiment. FIG. 2B is a block diagram of the media transfer management module 107 included in a system device 200 (e.g. a web services server 105 or computing device 115).

In one embodiment, the media transfer management module 107 includes a processing unit 201, a medical analyzer 203, a channel analyzer 205, a modality of interest (MOI) identification module 207, an inter-modality resolution modification module 209, a region of interest (ROI) identification module 211, an intra-modality resolution modification module 213 and a user interface engine 215.

It will be recognized that the modules 201, 203, 205, 207, 209, 211, 213, 215 comprising the media transfer management module 107 are not necessarily all on the same system device 200. In one embodiment, the modules 201, 203, 205, 207, 209, 211, 213, 215 are distributed across the system 100. For example, in one embodiment, the processing unit 201 is included in a computing device 115 at the node 109 or hub 111 and the other modules 203, 205, 207, 209, 211, 213, 215 are included in the web services server 105. In another example, the system may include a second web services server 105 (not shown) and the modules 201, 203, 205, 207, 209, 211, 213, 215 are divided between the two web services servers 105.

It will further be recognized that one or more of the modules 201, 203, 205, 207, 209, 211, 213, 215 may be omitted from the media transfer management module 107 depending on the embodiment. For example, in one embodiment, the medical analyzer 203 module is omitted. In another example, in one embodiment, the modality of interest (MOI) identification module 207 and the inter-modality resolution modification module 209 are omitted and a media stream is modified based on a channel limitation and a ROI and not based on a MOI. In yet another example, in one embodiment, the region of interest (ROI) identification module 211 and the intra-modality resolution modification module 213 are omitted and a media stream is modified based on a channel limitation and a MOI and not based on a ROI.

The processing unit 201 is code and routines for obtaining information from one or more of the node 109, the hub 111 and the EMR server 101 and transmitting the information to the appropriate component of the media transfer management module 107. In one embodiment, the processing unit 201 is a set of instructions executable by the processor 235. In another embodiment, the processing unit 201 is stored in the memory 237 and is accessible and executable by the processor 235. In either embodiment, the processing unit 201 is adapted for cooperation and communication with the processor 235, other components of the system device 200 and other components of the media transfer management module 107.

The processing unit 201 obtains information from one or more of the node 109, the hub 111 and the EMR server 101 and transmits the information to the appropriate component of the media transfer management module 107. In one embodiment, the information includes a media stream. For example, assume a high-resolution image of a patient's mole is loaded (in the form of data) onto the computing device 115 at the node 109, in one embodiment, the processing unit 201 is communicatively coupled to receive the media stream that includes the high-resolution image of the patient's mole and transmits the media stream to one or more of the MOI identification module 207 and the ROI identification module 211. This description may occasionally omit mention of the processing unit 201 for purposes of clarity and convenience. For example, for purposes of clarity and convenience, the above scenario may be described as one or more of the MOI identification module 207 and the ROI identification module 211 receiving a media stream.

In one embodiment, the processing unit 201 registers users including one or more of a medical service provider, node personnel and a patient. In one embodiment, the processing unit 201 registers medical service providers. In one embodiment, registering a medical service provider includes medical service provider login. For example, in one embodiment, the processing unit 201 registers a medical service provider when the processing unit 201 receives, from the hub 111, a login request associated with a medical service provider and determines to allow the login. In one embodiment, registering a medical service provider includes maintaining a medical service provider account. For example, in one embodiment, the processing unit 201 manages medical service provider accounts by creating medical service provider accounts (e.g. when new medical service providers are added to the system 100) and by updating existing medical service provider accounts. In one embodiment, a medical service provider account includes information regarding one or more of the associated medical service provider's education, experience and medical specialty.

In one embodiment, the processing unit 201 registers node personnel. In one embodiment, registering node personnel includes node personnel login. For example, in one embodiment, the processing unit 201 registers a technician when the processing unit 201 receives, from the node 109, a login request associated with the technician and determines to allow the login. In one embodiment, registering node personnel includes maintaining a node personnel account. For example, in one embodiment, the processing unit 201 manages node personnel accounts by creating node personnel accounts (e.g. when new node personnel are added to the system 100) and by updating existing node personnel accounts.

In one embodiment, the processing unit 201 registers patients. In one embodiment, registering a patient includes patient check-in. For example, assume a patient has arrived at the node 109 seeking a medical consultation, in one embodiment, the processing unit 201 registers the patient by passing a patient check-in signal to a scheduler (not shown) and the scheduler adds the patient to a list of patients seeking medical consultation. In one embodiment, registering a patient includes patient intake. For example, assume a patient has arrived at the node 109 seeking a medical consultation, in one embodiment, the processing unit 201 registers the patient by requesting to update the patient's EMR in the EMR storage 103 or (if the patient is new) requesting to create a new EMR in the EMR storage 103. In one embodiment, the processing unit 201 sends a message to the connection module 202 to indicate that a user at the node 109 or the hub 111 (e.g., a patient, a node personnel or a medical service provider) has been successfully registered.

In one embodiment, the processing unit 201 and its registration functionality are included in the web services server 105. In another embodiment, the processing unit 201 and its functionality are distributed across the system 100 (e.g. across the node 109, the hub 111, the EMR server 101 and the web services server 105). For example, the registration functionality of the processing unit 201 could be included in the node 109. For example, in one embodiment, the processing unit 201 includes software that is stored and operable on the computing device 115 of the node 109 and allows personnel and patients at the node 109 to be registered.

In one embodiment, the processing unit 201 passes information to the appropriate component of the media transfer management module 107. For example, the processing unit 201 is communicatively coupled to the components 203, 205, 207, 209, 211, 213, 215 of the media transfer management module 107 to send the information to the appropriate component of the media transfer management module 107. In another embodiment, the processing unit 201 stores the information in the storage device 241 (or any other non-transitory storage medium communicatively accessible). The appropriate component of the media transfer management module 107 can retrieve the information by accessing the storage device 241 (or other non-transitory storage medium).

The medical analyzer 203 is code and routines for performing an initial diagnosis of the patient. In one embodiment, the medical analyzer 203 is a set of instructions executable by the processor 235. In another embodiment, the medical analyzer 203 is stored in the memory 237 and is accessible and executable by the processor 235. In either embodiment, the medical analyzer 203 is adapted for cooperation and communication with the processor 235, other components of the system device 200 and other components of the patient queuing module 107.

The medical analyzer 203 performs an initial diagnosis of the patient. In one embodiment, the medical analyzer 203 performs an initial diagnosis of the patient based on input of one or more of the node personnel and a medical service provider. For example, assume a nurse at the node 109 inputs, using the computing device 115, that the patient is seeking consultation regarding a rash, in one embodiment, the medical analyzer 203 initially diagnoses the patient with eczema. In one embodiment, the medical analyzer 203 performs an initial diagnosis of the patient based on analysis performed by the medical analyzer 203. For example, in one embodiment, the medical analyzer 203 receives patient medical information, analyzes the patient medical information and performs an initial diagnosis based on the analysis of the patient medical information.

In one embodiment, the medical analyzer 203 receives patient medical information. Examples of patient medical information include, but are not limited to, one or more of lab results, test results, medical device 113 outputs (e.g. vital signs), medical history, symptoms, etc. In one embodiment, the medical analyzer 203 receives patient medical information from a node 109. For example, assume the patient's medical symptoms are obtained by the node personnel and entered into the computing device 115, in one embodiment, the medical analyzer 203 receives the symptoms from the computing device 115 of the node 109. In another example, assume a medical device 113 is used on the patient at the node 109, in one embodiment, the medical analyzer 203 receives output of the medical device 113. In one such embodiment, the medical analyzer 203 automatically receives patient medical information from a medical device 113 with store and forward technology without requiring recording or data entry of the output by the node personnel.

In one embodiment, the medical analyzer 203 receives patient medical information from the EMR server 101. For example, the medical analyzer 203 receives the patient's medical history as part of the patient's EMR. In one embodiment, the medical analyzer 203 automatically queries the EMR server 101 for relevant prior medical information in response to receiving an indication of a condition. This can help aid in diagnosis in conjunction with other information. For example, the medical analyzer 203 receives an indication that the patient might have melanoma and, in response, the medical analyzer 203 queries the EMR server 101 for previous images of the patient's back so that the medical analyzer 203 can compare the size (or absence) of moles in the past to the current size to identify fast-growing moles.

In one embodiment, the medical analyzer 203 analyzes the received patient information and performs an initial diagnosis based on the analysis of the patient medical information. For example, assume the patient information received includes that the patient's symptoms are tingling in his/her feet and a headache and the patient's EMR includes medical history showing that the patient is diabetic. In one embodiment, the medical analyzer 203 preforms an initial diagnosis that the patient is likely suffering from hyperglycemia based on the symptoms and medical history.

In one embodiment, the medical analyzer 203 associates a patient's ailment with a specialty of a medical service provider that can address the patient's condition. For example, assuming the patient is seeking medical consultation for eczema, in one embodiment, the medical analyzer 203 associates the patient with dermatology and/or general medicine.

In one embodiment, the patient's condition is based on medical analyzer's 203 initial diagnosis. For example, assume a nurse at the node 109 inputs, using the computing device 115, that the patient may be seen by either a dermatologist or a general practitioner since the patient is seeking consultation regarding a rash, in one embodiment, the medical analyzer 203 associates dermatology and general medicine with the patient. In another example, assume that hyperglycemia may be addressed by a general practitioner, in one embodiment, the medical analyzer 203 associates general medicine with the patient. In one embodiment, the patient's condition is based on a medical service provider's diagnosis. For example, assuming a general practitioner (i.e. a medical service provider) sees the rash and indicates that the rash is unusual, in one embodiment, the medical analyzer 203 associates dermatology with the patient.

In one embodiment, the medical analyzer 203 passes the initial diagnosis to one or more of the MOI identification module 207 and the ROI identification module 211. For example, the medical analyzer 203 is communicatively coupled to one or more of the MOI identification module 207 and the ROI identification module 211 to send the initial diagnosis to one or more of the MOI identification module 207 and the ROI identification module 211. In another embodiment, the medical analyzer 203 stores the initial diagnosis in the storage device 241 (or any other non-transitory storage medium communicatively accessible). The other modules of the patient queuing module 107 including, e.g., the MOI identification module 207 and/or the ROI identification module 211, can retrieve the initial diagnosis by accessing the storage device 241 (or other non-transitory storage medium). In yet another embodiment, the medical analyzer 203 passes the initial diagnosis to the EMR server 101 to update the patient's EMR in the EMR storage 103 and the other components of the patient queuing module 107 including, e.g., the MOI identification module 207 and/or the ROI identification module 211, can obtain the initial diagnosis from the EMR storage 103. For example, the medical analyzer 203 is communicatively coupled to the EMR server 101 to send the initial diagnosis for storage in the EMR storage 103 and, in one embodiment, one or more of the MOI identification module 207 and the ROI identification module 211 are communicatively coupled to obtain the initial diagnosis therefrom.

The channel analyzer 205 is code and routines for determining a channel and a channel limitation. In one embodiment, the channel analyzer 205 is a set of instructions executable by the processor 235. In another embodiment, the channel analyzer 205 is stored in the memory 237 and is accessible and executable by the processor 235. In either embodiment, the channel analyzer 205 is adapted for cooperation and communication with the processor 235, other components of the system device 200 and other components of the media transfer management module 107.

In one embodiment, the channel analyzer 205 receives polls from a user at the node 109 to check if a user at the hub 111 is requesting data from the node 109. The channel analyzer 205 receives a message from the hub 111 that bundles the access token with a POST. In some embodiments, the channel analyzer 205 also receives the ID token from the user at the node 109 and the access token from the user or directly from the EMR server 101. The channel analyzer 205 authenticates the access token. Based on the authentication, the channel analyzer 205 uses the UUIDs included in the ID token to determine if there is a match. For example, the channel analyzer 205 compares the identifier of a patient's arrival and the instance number included in the UUIDs from the node 109 and the hub 111 and determines that the node 109 and the hub 111 are communicating a same instance in a same media stream.

Responsive to determining the match, the channel analyzer 205 notifies the hub 111 that the node 109 will provide the media stream including details of the remote device that the hub 111 is requesting (e.g., based on a "device name" match in the UUIDs from the node 109 and the hub 111). In one embodiment, the channel analyzer 205 receives polls from the node 109 continuously, which is helpful for checking a change in the user's preferences quickly. In another embodiment, the channel analyzer 205 receives the polls from the node 109 periodically. Beginning from receiving a request for a media stream based on a device selection from the hub 111 and ending at responding the requested media stream from the node 109, the channel analyzer 205 transfers control messages and establishes a handshake between the node 109 and the hub 111.

Upon a successful handshake, the channel analyzer 205 initiates data transfer of the media stream. In some embodiments, the channel analyzer 205 captures information about the hub's 111 browser agent to identify the limitations of the browser relative to the container forms and codes supported. The channel analyzer 205 allocates buffers for streaming based on the device type. In one embodiment, the channel analyzer 205 receives data (e.g., details of the remote device) from the node 109 and forwards the data to the hub 111 as a response. For example, the node 109 initiates a first message (e.g., a POST message) for sending the data. The connection module 202 receives the first message and forwards the data to the hub 111. The hub 111 initiates a second message (e.g., a GET message) asynchronously to get the data. In another embodiment, the channel analyzer 205 also stores the data of the media stream in the storage 241.

In one embodiment, the channel analyzer 205 establishes the connection between the node 109 and the hub 111 over hypertext transfer protocol (HTTP), hypertext transfer protocol secure (HTTPS) and HTTP5. The channel analyzer 205 uses standard HTTP messages, GET and POST, to establish a connection. For example, the hub 111 implements JavaScript to include a GET message to get the data of a media stream. The channel analyzer 205 supports the streaming of multimedia (e.g. audio, video and text using JSON).

The channel analyzer 205 determines a channel limitation. Examples of channel limitations include, but are not limited to one or more of connection type, bandwidth, network latency, etc. For example, in one embodiment, the channel analyzer 205 determines one or more of the upload speed and the download speed of a channel between the computing device 115 of the node 109 and the web services server 105. In another example, in one embodiment, the channel analyzer 205 determines that the channel includes a highly limited 3G connection.

In one embodiment, the channel analyzer 205 passes the channel limitation to one or more of the inter-modality resolution modification module 209 and the intra-modality resolution modification module 213 depending on the embodiment. For example, the channel analyzer 205 is communicatively coupled to one or more of the inter-modality resolution modification module 209 and the intra-modality resolution modification module 213 to send the channel limitation to one or more of the inter-modality resolution modification module 209 and the intra-modality resolution modification module 213. In another embodiment, the channel analyzer 205 stores the channel limitation in the storage device 241 (or any other non-transitory storage medium communicatively accessible). The other modules of the media transfer management module 107 including, e.g., one or more of the inter-modality resolution modification module 209 and the intra-modality resolution modification module 213 can retrieve the channel limitation by accessing the storage device 241 (or other non-transitory storage medium).

The MOI identification module 207 is code and routines for identifying a modality of interest in a plurality of media streams. In one embodiment, the MOI identification module 207 is a set of instructions executable by the processor 235. In another embodiment, the MOI identification module 207 is stored in the memory 237 and is accessible and executable by the processor 235. In either embodiment, the MOI identification module 207 is adapted for cooperation and communication with the processor 235, other components of the system device 200 and other components of the media transfer management module 107.

In one embodiment, a media stream includes one or more types of media. In one embodiment, a media stream includes an auditory media. For example, the auditory media is the voice portion of a video conference media stream or VoIP phone call. In another embodiment, the auditory media is a recording (e.g. a sound file). In one embodiment, a media stream includes visual media. Examples of visual media include but are not limited to an image, video, animation, text, 3D model, etc.

In one embodiment, a media stream includes medical information. For example, the media stream includes a high-resolution image of a mole. In another example, the media stream includes audio of a patient's heart beat. In yet another example, the media stream includes a patient's lab results. In one embodiment, a media stream includes a medical device stream from a medical device 113 using store and forward technology. For example, in one embodiment, a stethoscope using store and forward technology generates the recording of the patient's heart beat.

In one embodiment, the MOI identification module 207 receives a plurality of media streams. For example, assume a patient at the node 109 is consulting with a cardiologist at the hub 111 about a potential heart problem, in one embodiment, the MOI identification module 207 receives a video conference media stream including audio and video of the patient and a media stream including an audio recording of the patient's heart beat from a stethoscope.

In one embodiment, the MOI identification module 207 identifies at least one modality of interest from the plurality of media streams. In one embodiment, the MOI identification module 207 identifies a modality of interest based on, but not limited to at least one of the patient's ailment, a preliminary diagnosis, a medical service provider specialty that matches the patient's ailment, media streams received and medical devices 113. For example, assume the patient's symptoms include fainting, in one embodiment, the MOI identification module 207 identifies a modality of interest associated with the heart (e.g. a media stream including an ECG or stethoscope recording). In another example, assume the preliminary diagnosis is a heart condition, in one embodiment, the MOI identification module 207 identifies a modality of interest associated with the heart. In another example, assume the medical analyzer 203 associated the patient with a cardiology specialty and/or the medical service provider consulting with the patient is a cardiologist, in one embodiment, the MOI identification module 207 identifies a modality of interest associated with the heart. In another example, the MOI identification module 207 identifies a modality of interest based on the media streams received (e.g. based on the media stream's inclusion of information for diagnosing a medical condition and/or the media stream's robustness). In yet another example, the MOI identification module 207 identifies a modality of interest based on the medical device 113 from which the media stream is received.

In one embodiment, the MOI identification module 207 identifies a modality of interest based at least in part on manual user input. For example, the MOI identification module 207 receives user input identifying at least one modality of interest. In one embodiment, the MOI identification module 207 identifies a modality of interest automatically. For example, the MOI identification module 207 identifies a modality of interest without user input.

In one embodiment, the MOI identification module 207 identifies a modality of interest based at least in part on the media stream that includes information for diagnosing a medical condition. For example, assume a patient is consulting with a doctor, using a web camera, regarding a lump in his/her breast tissue, which was imaged in a mammogram. Also, assume that diagnosing the lump as cancerous or benign depends on what the mammogram shows and not on what the patient can tell the doctor or what the doctor can see in a video conference. In one embodiment, the MOI identification module 207 identifies the media stream including the mammogram as the modality of interest based on the mammogram including information for diagnosing a medical condition.

In one embodiment, the MOI identification module 207 identifies a modality of interest based at least in part on the robustness of a media stream. In one embodiment, robustness of a media stream refers to the amount of resolution degradation the media stream may experience without losing its effectiveness for its intended use. For example, referring to diagnostic robustness of a media stream, the lower the resolution media stream can possess and/or the greater the degradation the media stream can endure without losing its diagnostic value, the more diagnostic robustness the media stream possesses.

In one embodiment, the MOI identification module 207 identifies a modality of interest based at least in part on the diagnostic robustness of a media stream. For example, again, assume the patient is consulting a cardiologist. Also, assume that the patient telling the cardiologist, via the video conference stream, that the patient passes out when the patient stands quickly after lying in a prone position has diagnostic value and the sound of the patient's heart beat also has diagnostic value. In one embodiment, the MOI identification module 207 identifies the media stream including the sound of the patient's heart as the modality of interest because the sample rate of the video conference stream is more robust. For example, the resolution (e.g. sample rate) of the patient speaking can be quite low without compromising the patient's message; however, the resolution of the heart beating may require a higher resolution in order to hear an anomaly (e.g. atrial flutter).

In one embodiment, the MOI identification module 207 identifies a modality of interest based at least in part on the media stream including a region of interest (ROI) identified by the ROI identification module 211 (discussed below). For example, the MOI identification module 207 is communicatively coupled to the ROI identification module 211 to receive an identifier of a media stream including an ROI and the MOI identification module 207 identifies that media stream as a MOI. In another embodiment, the ROI identification module 211 stores an identifier of a media stream associated with an ROI in the storage device 241 (or any other non-transitory storage medium communicatively accessible). The other modules of the media transfer management module 107 including the MOI identification module 207 can retrieve the identifier by accessing the storage device 241 (or other non-transitory storage medium).

In one embodiment, the MOI identification module 207 passes the MOI to the inter-modality resolution modification module 209. For example, the MOI identification module 207 is communicatively coupled to the inter-modality resolution modification module 209 to send the MOI to the inter-modality resolution modification module 209. In another embodiment, the MOI identification module 207 stores the MOI in the storage device 241 (or any other non-transitory storage medium communicatively accessible). The other modules of the media transfer management module 107 including the inter-modality resolution modification module 209 can retrieve the MOI by accessing the storage device 241 (or other non-transitory storage medium).

The inter-modality resolution modification module 209 is code and routines for modifying a media stream. In one embodiment, the inter-modality resolution modification module 209 is a set of instructions executable by the processor 235. In another embodiment, the inter-modality resolution modification module 209 is stored in the memory 237 and is accessible and executable by the processor 235. In either embodiment, the inter-modality resolution modification module 209 is adapted for cooperation and communication with the processor 235, other components of the system device 200 and other components of the media transfer management module 107.

The inter-modality resolution modification module 209 modifies a resolution of at least one media stream. Resolution refers to the quality of the media stream, for example, the resolution of an image, the frame rate of a video or the bit depth of audio. In one embodiment, the inter-modality resolution modification module 209 modifies at least one media stream based on one or more of a channel limitation and the content of a media stream without compromising the clinical acceptability of the media stream. Specifically, the resolution modification module 209 ensures that the reduced resolution, frame rate and/or bit depth does not alter the results of a diagnosis made by a trained physician or by the medical analyzer 203. In one embodiment, the inter-modality resolution modification module 209 modifies at least one media stream based on the channel limitation determined by the channel analyzer 205. For example, assume the channel analyzer 205 determined that the channel is a 3G connection with a limited bandwidth of X bits per second (bps), in one embodiment, the inter-modality resolution modification module 209 modifies at least one of the plurality of media streams so that the plurality of media streams use a total bandwidth Y where Y≤X.

In one embodiment, the inter-modality resolution modification module 209 modifies the resolution of at least one media stream based on the content of the media stream. In one embodiment, the type of modification the inter-modality resolution modification module 209 performs is based on the content of the media stream. For example, assume the modified media stream includes visual media such as an image or video frames, in one embodiment, the inter-modality resolution modification module 209 lowers the optical resolution of the visual media making the images or video frames more pixelated. In another example, assume the modified media stream includes visual media such as a video or audio media such as a sound recording, in one embodiment, the inter-modality resolution modification module 209 lowers the sample rate of the visual media (e.g. frame rate) or auditory media (e.g. bit depth, bit rate).

In one embodiment, which media stream(s) the inter-modality resolution modification module 209 modifies is based on the content of the media stream. For example, in one embodiment, the inter-modality resolution modification module 209 maintains the resolution of the media stream(s) identified as the MOI (i.e. the MOI is unmodified) and lowers the resolution of the other media streams (i.e. non-MOI are modified). In one embodiment, the inter-modality resolution modification module 209 modifies a media stream using a preserving (lossless or perceptually lossless) codec to improve quality compression on the modality of interest. For example, the modality of interest is compressed without sacrificing resolution using lossless compression and the other media streams are compressed using lossy compression. In one embodiment, the amount of loss in the lossy compression is based at least in part on the robustness of the media stream.

In one embodiment, the inter-modality resolution modification module 209 passes the media streams including a modified media stream to the ROI identification module 211. For example, the inter-modality resolution modification module 209 is communicatively coupled to the ROI identification module 211 to send the media streams including a modified media stream to the ROI identification module 211. In another embodiment, the inter-modality resolution modification module 209 stores the media streams including a modified media stream in the storage device 241 (or any other non-transitory storage medium communicatively accessible). The other components of the media transfer management module 107 including the ROI identification module 211 can retrieve the media streams including a modified media stream by accessing the storage device 241 (or other non-transitory storage medium).

In one embodiment, the inter-modality resolution modification module 209 identifies a connectivity issue and performs different techniques for minimizing bandwidth strain. For example, the inter-modality resolution modification module 209 switches from a video conference between the medical service provider and the patient to an Instant Messaging (IM) program or converts the speech in the video to text and transmits the text to the users. In one embodiment, the inter-modality resolution modification module 209 also identifies when the connection improves and reverts back (or upgrades if the communication began as the low-bandwidth heavy option) to the video chat.

In one embodiment, the inter-modality resolution modification module 209 modifies media stream order. For example, the inter-modality resolution modification module 209 modifies the order of the plurality of media streams so that more important streams are sent first. For example, again, assume that the streams include a video conference stream and audio of the patient's heart beat and the MOI is the recording of the patient's heart beat, in one embodiment, the inter-modality resolution modification module 209 transmits the recording before the video conference stream. Such an embodiment may help ensure that the most important information is sent when a node 109 has limited connectivity.

In one embodiment, the inter-modality resolution modification module 209 operates in real time. For example, in one embodiment, the inter-modality resolution modification module 209 receives real time information regarding connection speed from the channel analyzer 205, and, in real time, the inter-modality resolution modification module 209, responsive to a drop in connection speed, modifies the resolution of one or more media streams to reduce resolution, switches the video conference to an instant message program and modifies media stream order to send the MOI first.

In one embodiment, the inter-modality resolution modification module 209 sends the media streams including a modified media stream for presentation to a user. For example, in one embodiment, the inter-modality resolution modification module 209 sends the media streams including the modified media stream for presentation as part of a user interface generated by the user interface engine 215. In one embodiment, the inter-modality resolution modification module 209 passes the modified media to the user interface engine 215. For example, the inter-modality resolution modification module 209 is communicatively coupled to the user interface engine 215 to send the media streams including the modified media stream to the user interface engine 215. In another embodiment, the inter-modality resolution modification module 209 stores the media streams including the modified media stream in the storage device 241 (or any other non-transitory storage medium communicatively accessible). The other components of the media transfer management module 107 including the user interface engine 215 can retrieve the modified media by accessing the storage device 241 (or other non-transitory storage medium).

The ROI identification module 211 is code and routines for identifying a region of interest (ROI) within a media stream. In one embodiment, the ROI identification module 211 is a set of instructions executable by the processor 235. In another embodiment, the ROI identification module 211 is stored in the memory 237 and is accessible and executable by the processor 235. In either embodiment, the ROI identification module 211 is adapted for cooperation and communication with the processor 235, other components of the system device 200 and other components of the media transfer management module 107.

The ROI identification module 211 identifies at least one region of interest (ROI) in a media stream. Depending on the embodiment, the ROI is one of, but is not limited to, a spatial, temporal or spatio-temporal portion of a media stream. In one embodiment, spatial refers to an area on a single frame. For example, the ROI identification module 211 identifies the area including and immediately surrounding a problematic mole as a spatial region of interest according to one embodiment. In one embodiment, temporal refers to a subset of time associated with the stream. For example, temporal refers to a subset of one or more video frames or a portion of an audio recording. In one embodiment, the ROI identification module 211 identifies the subset of time by a high delta of change. For example, assume that when motion occurs in an ultrasound recording of a fetus there is a high delta of change between frames, in one embodiment, the ROI identification module 211 identifies a ROI as the time when motion occurs. In another example, assume that when a heart beats there is a high delta of change in volume, in one embodiment, the ROI identification module 211 identifies a ROI as the time(s) when the heart beats. In one embodiment, spatio-temporal refers to an area and a subset of time. For example, in the ultrasound example above, in one embodiment, the ROI identification module 211 identifies a ROI as the time when motion occurs and the spatial region of the ultrasound image where the motion occurs.

In one embodiment, the ROI is of interest to a medical service provider. For example, the ROI is a special region of a mammogram. In one embodiment, the ROI is based on a portion of the media stream that includes information for confirming or refuting a diagnosis. For example, assume the patient was initially diagnosed as having a breast lump (e.g. by the medical analyzer 203), in one embodiment, the ROI is a spatial region within the mammogram where the lump is shown.

In one embodiment, the ROI identification module 211 identifies the ROI based at least in part on user input. For example, in one embodiment, the ROI identification module 211 provides a medical service provider with a low resolution media stream. The medical service provider selects a portion of the media stream of interest and the ROI identification module 211 identifies the selected portion as the region of interest and the intra-modality resolution modification module 213 (discussed below) provides a higher resolution version of the ROI to the medical service provider. For example, a doctor receives a mammogram, circles a problematic area in the mammogram that might be cancerous and sends the ROI to the web services server 105 for an image with higher resolution for the ROI.

In another embodiment, the ROI identification module 211 automatically identifies a region of interest. For example, in one embodiment, the ROI identification module 211 automatically identifies a region within a media stream with a high delta of change between frames as a region of interest. In another example, in one embodiment, the ROI identification module 211 automatically identifies areas that might be problematic. For example, the ROI identification module 211 identifies a potential heart arrhythmia from a stethoscope audio recording of a heart beating and the intra-modality resolution modification module 213 (discussed below) preserves a high-frame rate for the time when the potential arrhythmia occurs.

In some embodiments, the ROI identification module 211 identifies the region of interest based upon diagnostic information input into the medial transfer management module 107 indicating that there is a problem. For example, the ROI identification module 211 identifies any shadow on an x-ray as a potential broken bone. In some other embodiments, the ROI identification module 211 uses the patient's labs in conjunction with the media to identify the region of interest. For example, the ROI identification module 211 receives a diagnostic test from the medical device 113 indicating that the patient has a fever in conjunction with lower right quadrant pain causes the ROI identification module 211 to focus on the appendix in a Computed Tomography (CT) scan.

In one embodiment, the ROI identification module 211 passes the ROI to the intra-modality resolution modification module 213. For example, the ROI identification module 211 is communicatively coupled to the intra-modality resolution modification module 213 to send the ROI to the intra-modality resolution modification module 213. In another embodiment, the ROI identification module 211 stores the ROI in the storage device 241 (or any other non-transitory storage medium communicatively accessible). The other components of the media transfer management module 107 including the intra-modality resolution modification module 213 can retrieve the ROI by accessing the storage device 241 (or other non-transitory storage medium).

The intra-modality resolution modification module 213 is code and routines for modifying a media stream. In one embodiment, the intra-modality resolution modification module 213 is a set of instructions executable by the processor 235. In another embodiment, the intra-modality resolution modification module 213 is stored in the memory 237 and is accessible and executable by the processor 235. In either embodiment, the intra-modality resolution modification module 213 is adapted for cooperation and communication with the processor 235, other components of the system device 200 and other components of the media transfer management module 107.

The intra-modality resolution modification module 213 modifies a resolution of at least one media stream. In one embodiment, the intra-modality resolution modification module 213 modifies the resolution of a media stream identified as a modality of interest. In one embodiment, the intra-modality resolution modification module 213 the resolution of a media stream to maintain a higher resolution for the ROI than the rest of the media stream. For example, assume the inter-modality resolution modification module 211 maintains the resolution of the modality of interest and lowers the resolution of the other media streams, in one embodiment, the intra-modality resolution modification module 213 modifies the resolution of the modality of interest to maintain high resolution for the ROI and lower the resolution of the rest of the media stream comprising the modality of interest.

In one embodiment, the intra-modality resolution modification module 213 modifies at least one media stream based on the channel limitation determined by the channel analyzer 205. For example, assume the channel analyzer 205 determined that the channel is a 3G connection with a limited bandwidth of X bits per second (bps), in one embodiment, the intra-modality resolution modification module 213 modifies a plurality of media streams using the 3G channel by lowering the resolution outside one or more regions of interest so that the plurality of media streams use a total bandwidth Y where Y≤X.

In one embodiment, the type of modification the intra-modality resolution modification module 213 performs is based on the content of the media stream. For example, assume the modified media stream includes visual media such as an image or video frames, in one embodiment, the intra-modality resolution modification module 213 lowers the optical resolution of the visual media making the images or video frames more pixelated outside the ROI. In another example, assume the modified media stream includes visual media such as a video or auditory media such as a sound recording, in one embodiment, the intra-modality resolution modification module 213 lowers the sample rate of the visual media (e.g. frame rate) or auditory media (e.g. bit rate) outside the ROI.

In one embodiment, the intra-modality resolution modification module 213 modifies a media stream using a preserving (lossless or perceptually lossless) codec to improve quality compression of the ROI. For example, the region of interest within the media stream is compressed without sacrificing resolution using lossless compression and the rest of the media stream is compressed using lossy compression.

In one embodiment, the intra-modality resolution modification module 213 passes the modified media stream to the user interface engine 215. For example, the intra-modality resolution modification module 213 is communicatively coupled to the user interface engine 215 to send the modified media stream to the user interface engine 215. In another embodiment, the intra-modality resolution modification module 213 stores the modified media stream in the storage device 241 (or any other non-transitory storage medium communicatively accessible). The other components of the media transfer management module 107 including the user interface engine 215 can retrieve the modified media by accessing the storage device 241 (or other non-transitory storage medium).

The user interface engine 215 is code and routines for generating graphical data for displaying a user interface. In one embodiment, the user interface engine 215 is a set of instructions executable by the processor 235. In another embodiment, the user interface engine 215 is stored in the memory 237 and is accessible and executable by the processor 235. In either embodiment, the user interface engine 215 is adapted for cooperation and communication with the processor 235, other components of the system device 200 and other components of the system 100.

The user interface engine 215 generates graphical data for displaying a user interface. The user interface engine 215 receives instructions from one or more of the inter-modality resolution modification module 209 and the intra-modality resolution modification module 213, depending on the embodiment, to generate graphical data for displaying the one or more media streams including the at least one modified media stream. For example, the user interface for a medical service provider includes three media streams 304 including a media stream with a patient's ECG, a video conference stream of the patient and the patient's pulse and blood pressure readings. In one embodiment, the user interface for a medical service provider includes one or more links 308 to patient medical records, for example, links to the patient's current and past forms, lab reports, vital signs, etc. In one embodiment, the user interface for a medical service provider includes one or more functional links for the medical service provider 306, for example, links to a calendar, a remote consultation, billing and a text box for entering search terms, etc.

User Interfaces

Figure 3:
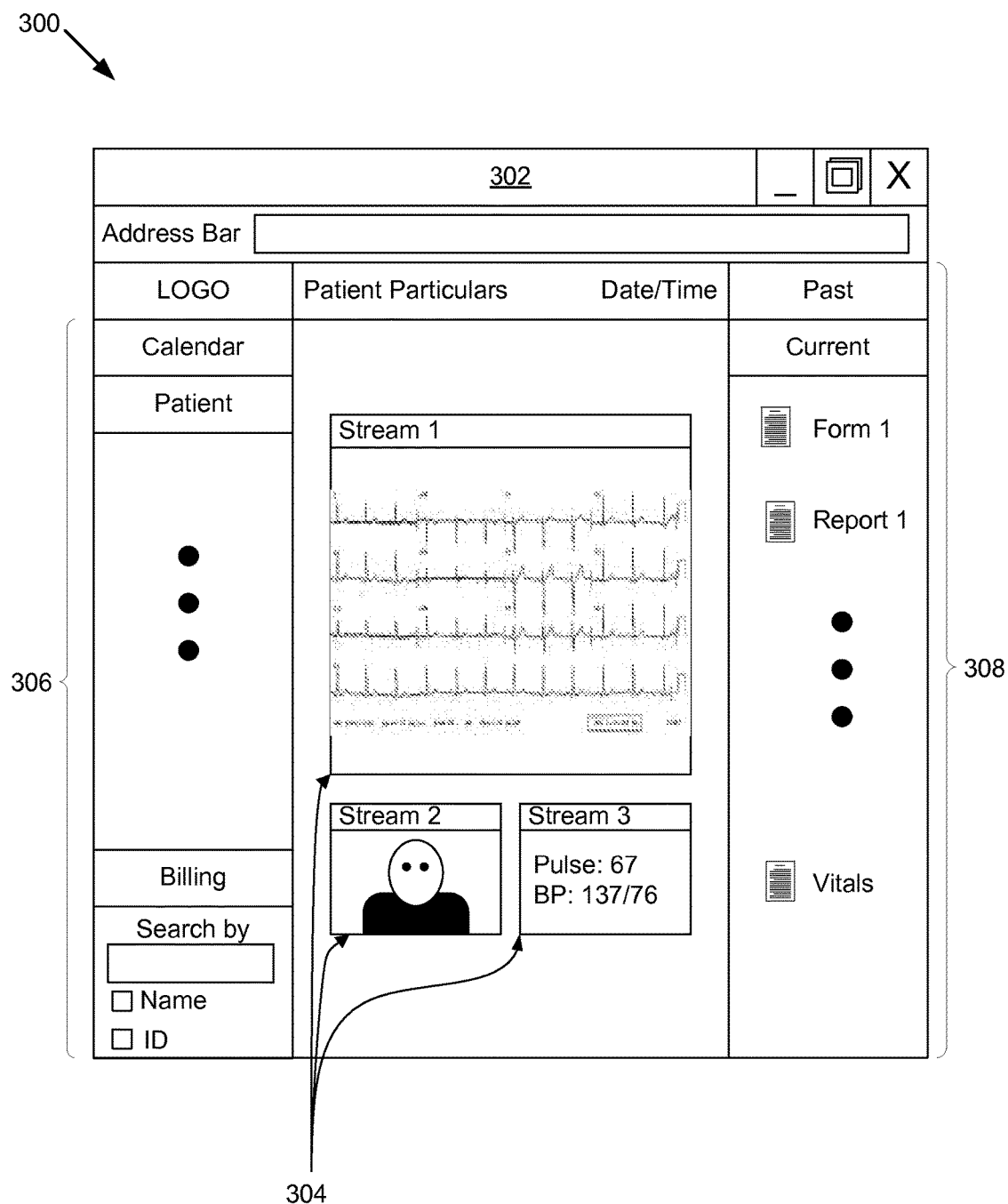
FIG. 3 illustrates an example of a user interface according to one embodiment.

FIG. 3 illustrates an example of a user interface 300 according to one embodiment. User interface 300 is an example user interface for a medical service provider. In one embodiment, the user interface is displayed in a web browser window 302. In one embodiment, the user interface for a medical service provider includes at least one media stream, For example, in the illustrated embodiment, three media streams 304 are displayed including a media stream with a patient's ECG, a video conference stream of the patient and the patient's pulse and blood pressure readings. In one embodiment, the user interface for a medical service provider includes one or more links 308 to patient medical records, for example, links to the patient's current and past forms, lab reports, vital signs, etc. In one embodiment, the user interface for a medical service provider includes one or more functional links for the medical service provider 306, for example, links to a calendar, a remote consultation, billing and a text box for entering search terms, etc.

In one embodiment, the inter-modality resolution modification module 209 maintains a high bit rate for the patient's ECG and a low frame rate for the video conference because it is more important that the doctor view the ECG than for the doctor to see a crisp image of the patient.

Methods

Figure 4:
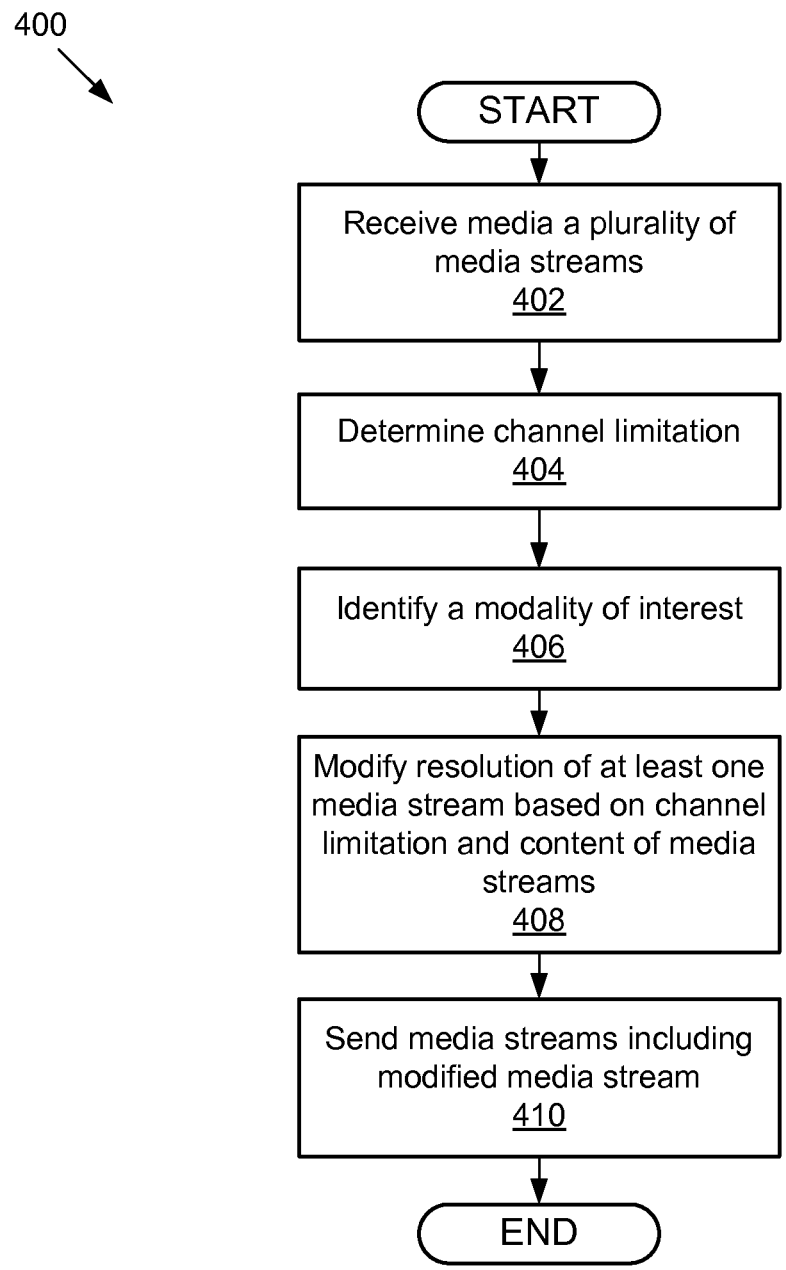
FIG. 4 is a flow chart illustrating a method for modifying a media stream based on a channel limitation according to one embodiment.

FIGS. 4, 5, 6, 7A and 7B depict various methods 400, 500, 600, 700 performed by the system described above with reference to FIGS. 1, 2A and 2B. FIG. 4 is a flow chart illustrating a general method 400 for modifying a media stream based on a channel limitation according to one embodiment. At block 402, the MOI identification module 207 receives a plurality of media streams. At block 404, the channel analyzer 205 determines a channel limitation. At block 406, the MOI identification module 207 identifies a modality of interest. At block 408, the inter-modality resolution modification module 209 modifies the resolution of at least one of the media streams based on the channel limitation and content of the media streams. For example, the resolution modification module 209 modifies the resolution of an image, the frame rate of a video or the bit depth of audio. The modification module 209 modifies the resolution without compromising the clinical acceptability of the streams, for example, by ensuring that the modification does not alter the results of a diagnosis. At block 410, the inter-modality resolution modification module 209 sends the media streams including the modified media stream for presentation and the method 400 ends. For example, the inter-modality resolution modification module 209 sends the media streams including the modified media stream for presentation as part of a user interface generated by the user interface engine 215.

Figure 5:
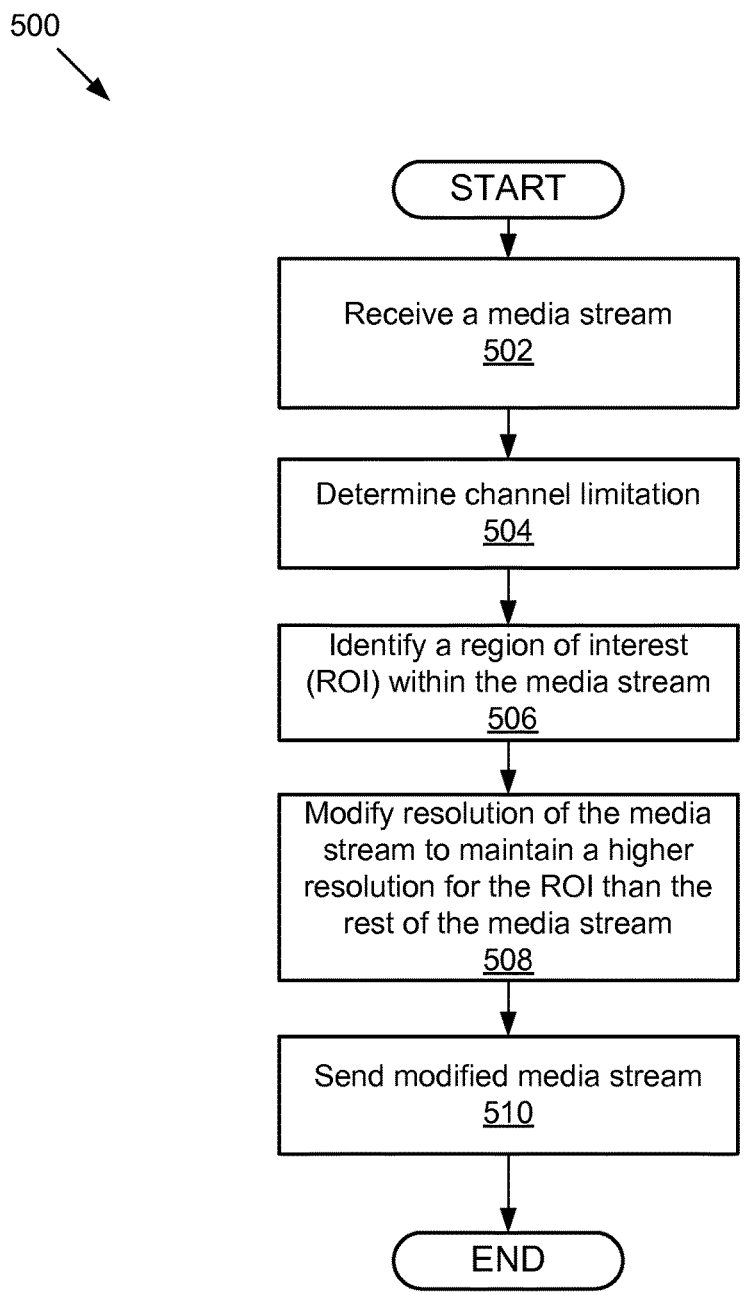
FIG. 5 is a flow chart illustrating another method for modifying a media stream based on a channel limitation according to one embodiment.

FIG. 5 is a flow chart illustrating another general method 500 for modifying a media stream based on a channel limitation according to one embodiment. At block 502, the ROI identification module 211 receives a media stream. At block 504, the channel analyzer 205 determines a channel limitation. At block 506, the ROI identification module 207 determines a region of interest (ROI) within the media stream. At block 508, the intra-modality resolution modification module 213 modifies the resolution of the media stream to maintain a higher resolution for the ROI than the rest of the media stream. At block 510, the intra-modality resolution modification module 213 sends the modified media stream and the method 500 ends. For example, the intra-modality resolution modification module 213 sends the modified media stream for presentation as part of a user interface generated by the user interface engine 215.

Figure 6:
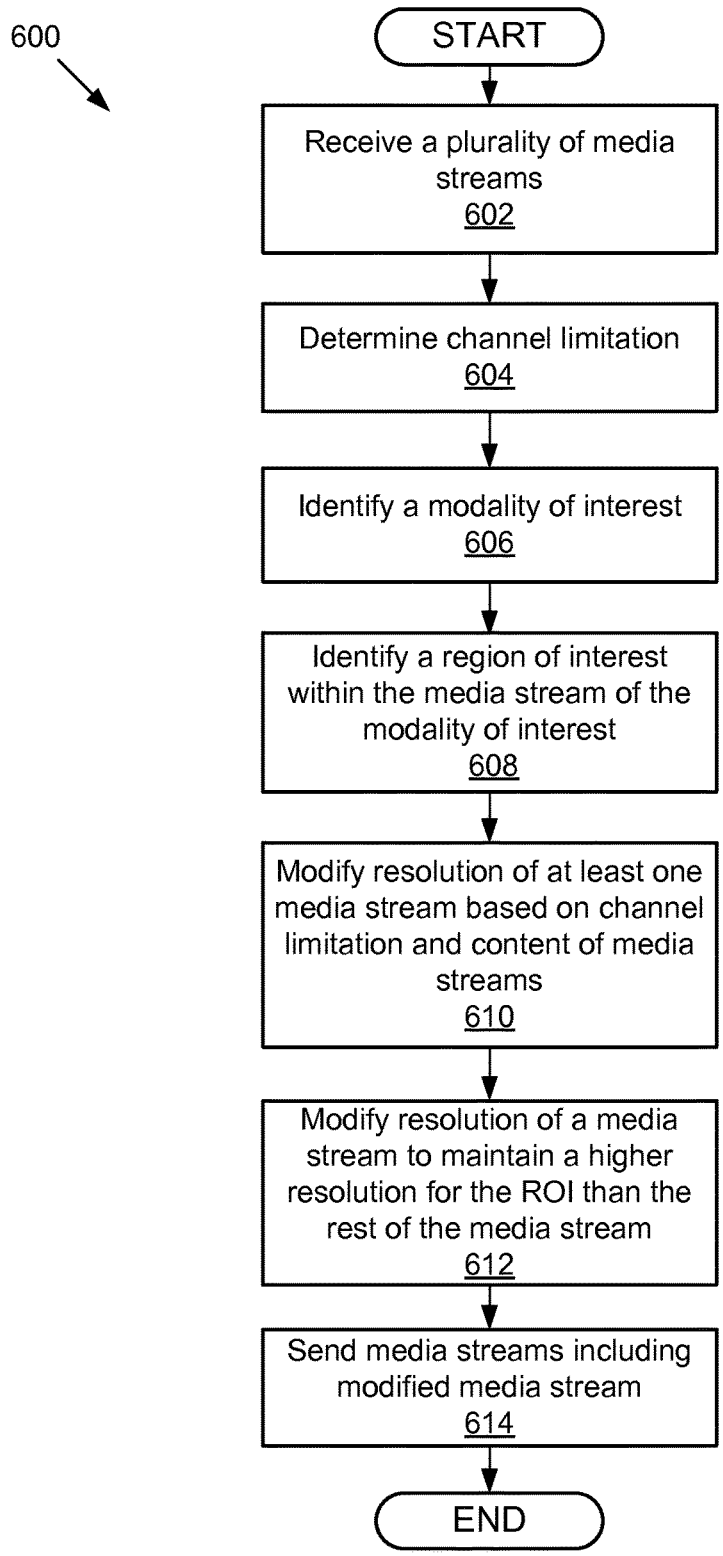
FIG. 6 is a flow chart illustrating yet another method for modifying a media stream based on a channel limitation according to one embodiment.

FIG. 6 is a flow chart illustrating yet another general method 600 for modifying a media stream based on a channel limitation according to one embodiment. At block 602, the MOI identification module 207 receives a plurality of media streams. At block 604, the channel analyzer 205 determines a channel limitation. At block 606, the MOI identification module 207 determines a modality of interest. At block 608, the ROI identification module 207 determines a region of interest within the modality of interest. At block 610, the inter-modality resolution modification module 209 modifies the resolution of at least one of the media streams, and, at block 612, the intra-modality resolution modification module 213 further modifies the resolution of a media stream from the plurality of media streams to maintain a higher resolution for the ROI than the rest of that media stream. At block 614, the intra-modality resolution modification module 213 sends the media streams including the modified media stream and the method 600 ends. For example, the intra-modality resolution modification module 213 sends the media streams including the modified media stream for presentation as part of a user interface generated by the user interface engine 215.

Figure 7A:
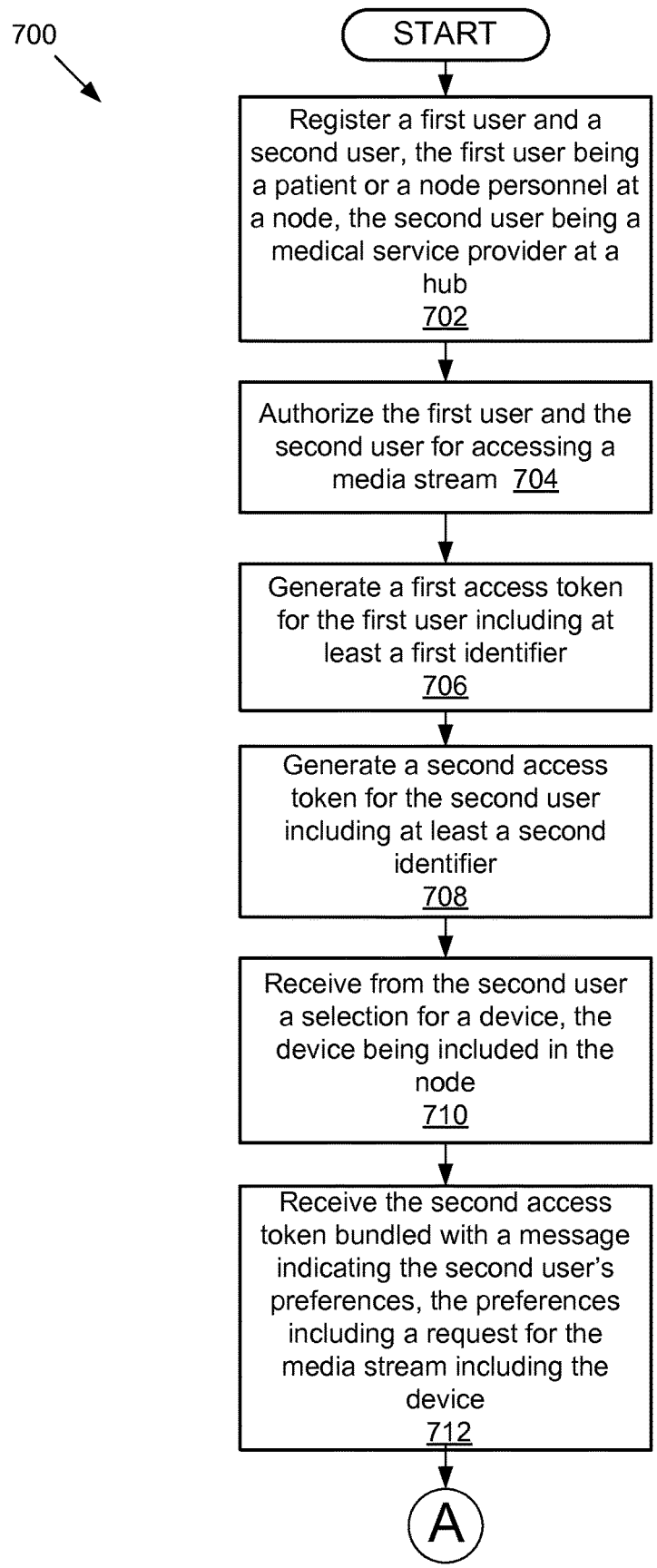
FIGS. 7A and 7B are flow charts illustrating one method for establishing a connection for transferring a media stream according to one embodiment.
Figure 7B:
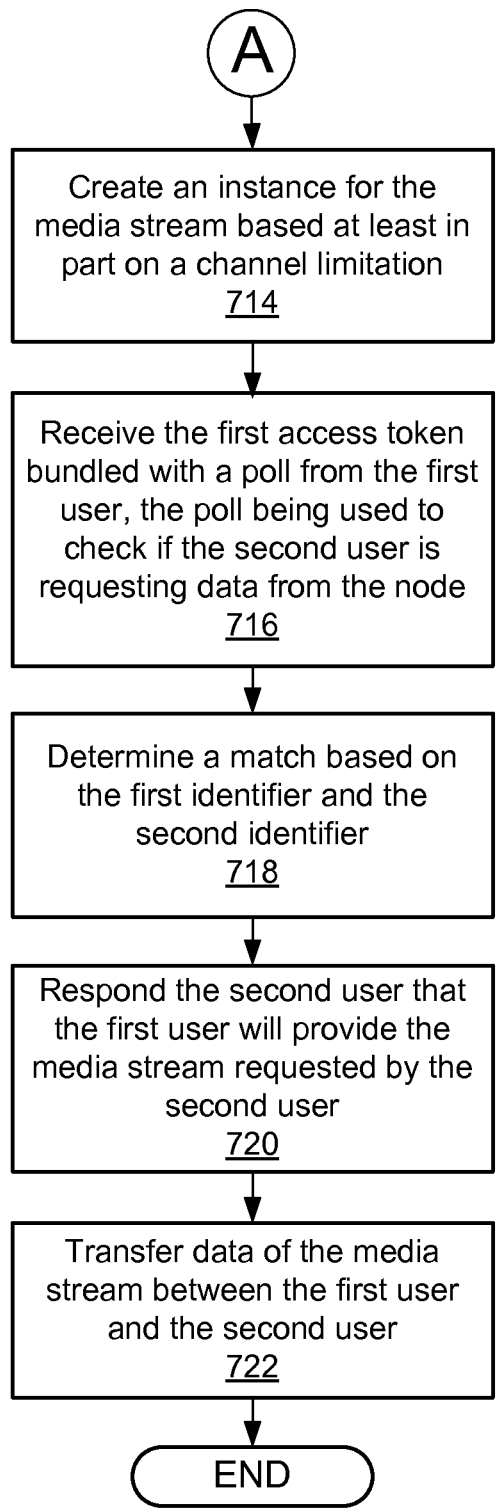

FIGS. 7A and 7B are flow charts illustrating one method for establishing a connection for transferring a media stream according to one embodiment. Referring to FIG. 7A, at block 702, the processing unit 201 registers a first user and a second user. The first user is a patient or a node personnel at the node 109. The second user is a medical service provider at the hub 111. At block 704, the EMR server 101 authorizes the first user and the second user for accessing a media stream. At block 706, the EMR server 101 generates a first access token for the first user including at least a first identifier. At block 708, the EMR server 101 generates a second access token for the second user including at least a second identifier. In one embodiment, an access token includes an identifier (ID) that uniquely identifies the stream. For example, the identifier is a universally unique identifier (UUID) that consists of a patient encounter ID that identifies the patient's arrival, a device name and an instance number. At block 710, the channel analyzer 205 receives from the second user a selection for a device. The device is included in the node 109. For example, the channel analyzer 205 receives a message from a doctor at the hub 111 requesting streaming of media from a general examination camera or a pulse oximeter or both. At block 712, the channel analyzer 205 receives the second access token bundled with a message indicating the second user's preferences. The preferences include a request for a media stream including the device.

Referring now to FIG. 7B, at block 714, the channel analyzer 205 creates an instance for the media stream based at least in part on a channel limitation. At block 716, the channel analyzer 205 receives the first access token bundled with a poll from the first user. The poll is used to check if the second user is requesting data from the node 109. At block 718, the channel analyzer 205 determines a match based on the first identifier and the second identifier. For example, if each of the first identifier and the second identifier is a UUID, the channel analyzer 205 compares the identifier of a patient's arrival and the instance number included in the UUIDs and determines that the node 109 and the hub 111 are communicating a same instance in a same media stream. At block 720, the channel analyzer 205 responds the second user that the first user will provide the media stream requested by the second user. At block 722, the channel analyzer 205 transfers data of the media stream between the first user and the second user. For example, the channel analyzer 205 receives data from the first user at the node 109 and forwards the data to second user at the hub 111 as a response.

The foregoing description of the embodiments has been presented for the purposes of illustration and description. It is not intended to be exhaustive or to limit the present embodiments to the precise forms disclosed. Many modifications and variations are possible in light of the above teaching. It is intended that the scope of the present embodiments be limited not by this detailed description, but rather by the claims of this application. As will be understood by those familiar with the art, the present embodiments may take other specific forms without departing from the spirit or essential characteristics thereof. Likewise, the particular naming and division of the modules, routines, features, attributes, methodologies and other aspects are not mandatory or significant, and the mechanisms that implement one embodiment or its features may have different names, divisions and/or formats. Furthermore, as will be apparent, the modules, routines, features, attributes, methodologies and other aspects of the embodiments can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the embodiments are in no way limited to implementation in any specific programming language, or for any specific operating system or environment. Accordingly, the disclosure is intended to be illustrative, but not limiting, of the scope, which is set forth in the following claims.

What is claimed is:

1. A method for transferring a plurality of media streams, the method comprising:
    receiving, using one or more computing devices, the plurality of media streams, the plurality of media streams including at least one type of media and a plurality of pointers to one or more different parts of the at least one type of media;
    determining, using the one or more computing devices, a channel limitation;
    analyzing the plurality of media streams to identify the at least one type of media as a modality of interest, wherein the modality of interest includes diagnostic information;
    identifying, using the one or more computing devices, at least one region of interest from a media stream including the modality of interest based on a pointer from the plurality of pointers, wherein the pointer is associated with diagnostic information within the one or more different parts of the media stream including the modality of interest;
    modifying, using the one or more computing devices, a resolution of the media stream including the modality of interest based on the channel limitation, the modification maintaining a higher resolution for the at least one region of interest within the media stream including the modality of interest than the rest of the media stream including the modality of interest;
    modifying, using the one or more computing devices, a resolution of remaining media streams of the plurality of media streams that do not include the modality of interest;
    determining, using the one or more computing devices, an order of transmission of the plurality of media streams, the order specifying that the media streams including the modality of interest be transmitted prior to transmitting the remaining media streams of the plurality of media streams; and
    transmitting, using the one or more computing devices, the plurality of media streams in the order of transmission.

2. The method of claim 1, wherein the modality of interest includes medical information and the region of interest is based on a portion of the modality of interest that includes information for diagnosing a condition.

3. The method of claim 1, wherein the plurality of media streams are associated with a patient and further comprising:
    performing an initial diagnosis of the patient, and
    wherein the region of interest is based on a portion of the modality of interest that includes information to confirm the initial diagnosis.

4. The method of claim 1, wherein the plurality of media streams include a medical device stream from a medical device using store and forward technology.

5. The method of claim 1, wherein the modality of interest includes a visual media and modifying the resolution of the media stream including the modality of interest includes modifying an optical resolution of the visual media.

6. The method of claim 1, wherein the modality of interest includes a visual media and modifying the resolution of the media stream including the modality of interest includes modifying a frame rate of the visual media.

7. The method of claim 1, wherein the modality of interest includes an auditory media and modifying the resolution of the media stream including the modality of interest includes modifying a bit rate of the auditory media.

8. A system for transferring a plurality of media streams, the system comprising:
    one or more processors;
    a channel analyzer stored on a memory and executable by the one or more processors, the channel analyzer configured to determine a channel limitation;
    a modality of interest identification module stored on the memory and executable by the one or more processors, the modality of interest identification module configured to receive the plurality of media streams including at least one type of media and a plurality of pointers to one or more different parts of the at least one type of media and analyze the plurality of media streams to identify the at least one type of media as a modality of interest, wherein the modality of interest includes diagnostic information;
    a region of interest identification module stored on the memory and executable by the one or more processors, the region of interest identification module configured to identify at least one region of interest from a media stream including the modality of interest based on a pointer from the plurality of pointers, wherein the pointer is associated with diagnostic information within the one or more different parts of the media stream including the modality of interest, the region of interest identification module communicatively coupled to the modality of interest identification module;

an intra-modality resolution modification module stored on the memory and executable by the one or more processors, the intra-modality resolution modification module configured to modify a resolution of the media stream including the modality of interest based on the channel limitation, the modification maintaining a higher resolution for the at least one region of interest within the media stream including the modality of interest than the rest of the media stream including the modality of interest, the intra-modality resolution modification module communicatively coupled to the channel analyzer to receive the channel limitation, the modality of interest identification module to receive the modality of interest, and communicatively coupled to the region of interest identification module to receive the at least one region of interest;

an inter-modality resolution modification module stored on the memory and executable by the one or more processors, the inter-modality resolution modification module configured to modify a resolution of remaining media streams of the plurality of media streams that do not include the modality of interest and determine an order of transmission of the plurality of media streams, the order specifying that the at least one type of media including the modality of interest be transmitted prior to transmitting the remaining media streams of the plurality of media streams, the inter-modality resolution modification module communicatively coupled to the channel analyzer and the modality of interest identification module; and a communication unit configured to transmit the plurality of media streams in the order of transmission, the communication unit communicatively coupled to the intra-modality resolution modification module and the inter-modality resolution modification module.

9. The system of claim 8, wherein the modality of interest includes medical information and the region of interest is based on a portion of the modality of interest that includes information for diagnosing a condition.

10. The system of claim 8, wherein the plurality of media streams are associated with a patient and further comprising:
a medical analyzer stored on the memory and executable by the one or more processors, the medical analyzer configured to perform an initial diagnosis of the patient, and
wherein the region of interest is based on a portion of the modality of interest that includes information to confirm the initial diagnosis, the region of interest identification module communicatively coupled to the medical analyzer to receive the initial diagnosis.

11. The system of claim 8, wherein the plurality of media streams include a medical device stream from a medical device using store and forward technology.

12. The system of claim 8, wherein the modality of interest includes a visual media and modifying the resolution of the media stream including the modality of interest includes modifying an optical resolution of the visual media.

13. The system of claim 8, wherein the modality of interest includes a visual media and modifying the resolution of the media stream including the modality of interest includes modifying a frame rate of the visual media.

14. The system of claim 8, wherein the modality of interest includes an auditory media and modifying the resolution of the media stream including the modality of interest includes modifying a bit rate of the auditory media.

15. A computer program product comprising a non-transitory computer useable medium including a computer readable program, wherein the computer readable program when executed on a computer causes the computer to:
receive a plurality of media streams, the plurality of media streams including at least one type of media and a plurality of pointers to one or more different parts of the at least one type of media;
determine a channel limitation;
analyze the plurality of media streams to identify at least one type of media as a modality of interest, wherein the modality of interest includes diagnostic information;
identify at least one region of interest from a media stream including the modality of interest based on a pointer from the plurality of pointers, wherein the pointer is associated with diagnostic information within the one or more different parts of the media stream including the modality of interest;
modify a resolution of the media stream including the modality of interest based on the channel limitation, the modification maintaining a higher resolution for the at least one region of interest within the media stream including the modality of interest than the rest of the media stream including the modality of interest;
modify a resolution of remaining media streams of the plurality of media streams that do not include the modality of interest;
determine an order of transmission of the plurality of media streams, the order specifying that the media streams including the modality of interest be transmitted prior to transmitting the remaining media streams of the plurality of media streams; and
transmit the plurality of media streams in the order of transmission.

16. The computer program product of claim 15, wherein the modality of interest includes medical information and the region of interest is based on a portion of the modality of interest that includes information for diagnosing a condition.

17. The computer program product of claim 15, wherein the plurality of media streams are associated with a patient and the computer readable program when executed on a computer further causes the computer to:
perform an initial diagnosis of the patient, and
wherein the region of interest is based on a portion of the modality of interest that includes information to confirm the initial diagnosis.

18. The computer program product of claim 15, wherein the plurality of media streams include a medical device stream from a medical device using store and forward technology.

19. The computer program product of claim 15, wherein the modality of interest includes a visual media and modifying the resolution of the media stream including the modality of interest further includes instructions to modify an optical resolution of the visual media.

20. The computer program product of claim 15, wherein to modify the resolution of the media stream including the modality of interest, the computer readable program further includes instructions to modify a sample rate of the media stream including the modality of interest.

\* \* \* \* \*